(12) United States Patent
Zhao et al.

(10) Patent No.: US 12,177,492 B2
(45) Date of Patent: *Dec. 24, 2024

(54) METHOD AND APPARATUS FOR VIDEO FILTERING

(71) Applicant: TENCENT AMERICA LLC, Palo Alto, CA (US)

(72) Inventors: Liang Zhao, Sunnyvale, CA (US); Yixin Du, Los Altos, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,563

(22) Filed: Jun. 9, 2023

(65) Prior Publication Data
US 2023/0319317 A1 Oct. 5, 2023

Related U.S. Application Data

(63) Continuation of application No. 17/360,761, filed on Jun. 28, 2021, now Pat. No. 11,743,507.
(Continued)

(51) Int. Cl.
*H04N 19/82* (2014.01)
*H04N 19/117* (2014.01)
(Continued)

(52) U.S. Cl.
CPC .......... *H04N 19/82* (2014.11); *H04N 19/117* (2014.11); *H04N 19/119* (2014.11);
(Continued)

(58) Field of Classification Search
CPC ...... H04N 19/86; H04N 19/182; H04N 19/70; H04N 19/119; H04N 19/176;
(Continued)

(56) References Cited

U.S. PATENT DOCUMENTS

| 2014/0307773 A1 | 10/2014 | Minoo et al. |
| 2016/0156938 A1 | 6/2016 | Fu et al. |

(Continued)

FOREIGN PATENT DOCUMENTS

| JP | 2016539542 A | 12/2016 |
| WO | 2020182620 A1 | 9/2020 |
| WO | 2020197937 A1 | 10/2020 |

OTHER PUBLICATIONS

Anonymous, "Abstract," AOMedia, Jan. 1, 2019, . Retrieved from the Internet: <URL: https:1/aomedia.googlesource.oom/aom/?refs/heads/master/doc/AlgorithmDescription.md>, 12 pages.

(Continued)

*Primary Examiner* — Tsion B Owens
(74) *Attorney, Agent, or Firm* — ArentFox Schiff LLP

(57) ABSTRACT

A method for filtering in video encoding is provided. In the method, based on a determination that (i) an intra block copy (IBC) mode is disabled for a chroma component of a block and the IBC mode is enabled for a luma component of the block or (ii) decoupled partitioning structures are applied to the luma component of the block and the chroma component of the block, at least one loop filter is enabled for the chroma component of the block, a first sample of the luma component at a location in the block is determined based on a first loop filter configuration that does not include the at least one loop filter, and a second sample of the chroma component at the location in the block is determined based on a second loop filter configuration that includes the at least one loop filter.

20 Claims, 35 Drawing Sheets

Related U.S. Application Data

(60) Provisional application No. 63/126,423, filed on Dec. 16, 2020.

(51) Int. Cl.
    *H04N 19/119*    (2014.01)
    *H04N 19/176*    (2014.01)
    *H04N 19/186*    (2014.01)
    *H04N 19/593*    (2014.01)
    *H04N 19/70*    (2014.01)
    *H04N 19/86*    (2014.01)

(52) U.S. Cl.
    CPC ......... *H04N 19/176* (2014.11); *H04N 19/186* (2014.11); *H04N 19/593* (2014.11); *H04N 19/70* (2014.11); *H04N 19/86* (2014.11)

(58) Field of Classification Search
    CPC .... H04N 19/593; H04N 19/14; H04N 19/117; H04N 19/82; H04N 19/129
    See application file for complete search history.

(56) References Cited

U.S. PATENT DOCUMENTS

| | | | |
|---|---|---|---|
| 2020/0177910 A1* | 6/2020 | Li | ........................ H04N 19/86 |
| 2020/0228833 A1 | 7/2020 | Xu et al. | |
| 2020/0314424 A1* | 10/2020 | Hu | ....................... H04N 19/463 |

OTHER PUBLICATIONS

Appendix A, JVET-K0500-BMS-1.0, 2018, 26 pages.
Appendix A, JVET-L0283_CE3-1.1.1-VTM-2.0.1, CE3-1.1.1, 2018, 38 pages.
Appendix A, JVET-L0285_CE6-1.3a-VTM-2.0.1, VTM-2.0.1 CE6-1.3a, VTM-2.0.1, InterMTS on, VTM-2.0.1, InterMTS on CE6-1.3a, 2018, 57 pages.
Appendix A, JVET-M0497-CE6-2-3a-VTM-3.0, 2019, 57 pages.
Appendix A, JVET-N0394-test1, VTM-4.0, 2019, 32 pages.
Appendix A, JVET-O0539-vs-CE6-2.1a-CE6-2.1a, 2019, 27 pages.
Appendix A, JVET-O0545_Log2MaxTbSize=4-VTM-5.0, 2019, 32 pages.
Appendix B, JVET-K0500-VTM-1.0, 2018, 42 pages.
Appendix B, JVET-L0283_CE3-1.1.2-VTM-[vcgit.hhi.fraunhoder.de][jvet][VVCSoftware_BMS.git][599ab8f][VTM], 2018, 43 pages.
Appendix B, JVET-L0285_CE6-1.3a_LowQP-VTM-2.0.1, QP 5, 10, 15, 20, 2018, 57 pages.
Appendix B, JVET-M0497-CE6-2-3a-LowQP-VTM-3.0, 2019, 77 pages.
Appendix B, JVET-N0394-test2, VTM-4.0, 2019, 32 pages.
Appendix B, JVET-O0539-vs-CE6-2.1a-LowQP-CE6-2.1a, LowQP, 2019, 23 pages.
Appendix B, JVET-O0545_Log2MaxTbSize=5-VTM-5.0, 2019, 32 pages.
Appendix C, JVET-K0500-NoBF-VTM-1.0, 2018, 38 pages.
Appendix C, JVET-L0283_CE3-1.1.3-C1-VTM-2.0.1, CE3-1.1.3 + BMS-2.0.1 4-Tap IF, 2018, 48 pages.
Appendix C, JVET-L0285_CE6-1.3b-VTM-2.0.1, 2018, 57 pages.
Appendix C, JVET-N0394-test3, VTM-4.0, 2019, 44 pages.
Appendix C, JVET-O0539-vs-CE6-2.1b-CE6-2.1b, 2019, 27 pages.
Appendix C, JVET-O0545_Log2MaxTbSize=6-VTM-5.0, 2019, 32 pages.
Appendix D, JVET-L0283_CE3-1.1.3-C2-VTM-2.0.1, CE6-1.1.3 + CE6-3.1.2, 2018, 28 pages.
Appendix D, JVET-L0285_CE6-1.3b-LowQP-VTM-2.0.1, QP 5, 10, 15, 20, 2018, 57 pages.
Appendix D, JVET-N0394-test4, VTM-4.0, 2019, 32 pages.
Appendix D, JVET-O0539-vs-CE6-2.1b-LowQP-CE6-2.1b + Proposed, LowQP, 2019, 23 pages.
Appendix E, JVET-L0283_CE3-1.1.3-C3-VTM-[vcgit.hhi.faunhofer.de][jvet][VVCSoftware_BMS.git][599ab8f][VTM], CE3-1.1-3+3.2.1-VTM, 2018, 43 pages.
Appendix E, JVET-N0394-test5e, VTM-4.0, 2019, 44 pages.
Appendix E, JVET-O0539-vs-VTM5-VTM-5.0, 2019, 32 pages.
Appendix F, JVET-L0283_CE3-1.1.3-VTM-2.0.1, CE3-1.1.3, 2018, 28 pages.
Appendix F, JVET-N0394-test6, VTM-4.0, 2019, 44 pages.
Appendix F, JVET-O0539-vs-VTM5-LowQP_r1-VTM-5.0, LowQP, 2019, 28 pages.
Appendix G, JVET-L0283_CE3-1.1.4-VTM-2.0.1, CE3-1.1.4, 2018, 28 pages.
Appendix G, JVET-N0394-test7, VTM-4.0, 2019, 44 pages.
Bross et al., "General Video Coding Technology in Responses to the Joint Call for Proposals on Video Compression with Capability beyond HEVC," IEEE Transactions on Circuits and Systems for Video Technology, 2019, 16 pages.
Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K1001, pp. 1-134, total of 142 pgs.
Bross et al., "CE3: Multiple reference line intra prediction (Test 1.1.1, 1.1.2, 1.1.3, and 1.1.4)," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0283-v2, 7 pages.
Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K1001-v6, 138 pages.
Bross et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O2001-vE, 456 pages.
Bross et al., "Versatile Video Coding (Draft 8)," Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vE, 510 pages.
Chang et al., "Intra prediction using multiple reference lines for the versatile video coding standard," Applications of Digital Image Processing XLII, 2019, vol. 11137, 8 pages.
Extended European Search Report in EP21907357.4, mailed Apr. 3, 2023, 11 pages.
International Search Report in PCT/US2021/039593, mailed Sep. 30, 2021, pages.
Racape et al., "CE3-related: Wide-angle intra prediction for non-square blocks," Joint Video Experts Team (JVET) of ITU-T SG 16 WP 3 and ISO/IEC JTC 1/SC 29/WG 11, 11th Meeting: Ljubljana, SI, Jul. 11-18, 2018, Document: JVET-K0500, 9 pages.
Racape et al., "CE3-related: Wide-angle intra prediction for non-square blocks," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0500_r2, 7 pages.
Racape et al., "CE3-related: Wide-angle intra prediction for non-square blocks," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0500_r1, 7 pages.
Racape et al., "CE3-related: Wide-angle intra prediction for non-square blocks," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0500_r3, 12 pages.
Racape et al., "CE3-related: Wide-angle intra prediction for non-square blocks," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0500_r4, 13 pages.
Rivaz et al., "AV1 Bitstream & Decoding Process Specification," The Alliance for Open Media, 2018, last modified Jan. 8, 2019, Version 1.0.0 with Errata 1, 681 pages.
Zhang et al., "Fast Adaptive Multiple Transform for Versatile Video Coding," 2019 Data Compression Conference (DCC), 2019, 10 pages.
Office Action in JP2022554804, mailed Nov. 7, 2023, 8 pages.

(56) References Cited

OTHER PUBLICATIONS

Zhang et al., "Fast DST-7/DCT-8 with Dual Implementation Support for Versatile Video Coding," IEEE Transactions on Circuits and Systems for Video Technology, 2020, IEEE, 17 pages.

Zhao et al., "CE3-related: Unified MPM list based on CE3.3 and CE3-3.5.1," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0394-r2, 11 pages.

Zhao et al., "CE3-related: Unified MPM list based on CE3.3 and CE3-3.5.1," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0394, 12 pages.

Zhao et al., "CE6-related: unified LFNST using block size independent kernel," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0539-v2, 13 pages.

Zhao et al., "CE6: Fast DST-7/DCT-8 with dual implementation support (Test 6.2.3)," Joint Video Experts Team (JVET) of ITU-T Sg 16 WP 3 and ISO/IEC JTC 1/SC 29/WG 11, 13th Meeting: Marrakech, MA, Jan. 9-18, 2019, Document: JVET-M0497, 11 pages.

Zhao et al., "CE6: On 8-bit primary transform core (Test 6.1.3)," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0285-r1, 17 pages.

Zhao et al., "CE6: On 8-bit primary transform core (Test 6.1.3)," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0285, 17 pages.

Zhao et al., "Coupled Primary and Secondary Transform for Next Generation Video Coding," 2018 IEEE Visual Communications and Image Processing (VCIP), 2018, 4 pages.

Zhao et al., "Joint Separable and Non-Separable Transforms for Next-Generation Video Coding," IEEE Transactions on Image Processing, 2018, vol. 27, No. 5, 13 pages.

Zhao et al., "Low-Complexity Intra Prediction Refinements for Video Coding," 2018 Picture Coding Symposium (PCS), 2018, IEEE, 5 pages.

Zhao et al., "Non-CE6: Configurable max transform size in VVC," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0545-v2, 6 pages.

Zhao et al., "Novel Statistical Modeling, Analysis and Implementation of Rate-Distortion Estimation for H.264/AVC Coders," IEEE Transactions on Circuits and Systems for Video Technology, May 2010, vol. 20, No. 5, 14 pages.

Zhao et al., "NSST: Non-Separable Secondary Transforms for Next Generation Video Coding," 2016 Picture Coding Symposium (PCS), IEEE, 2016, 5 pages.

Zhao et al., "Wide Angular Intra Prediction for Versatile Video Coding," 2019 Data Compression Conference (DCC), 2019, IEEE, 10 pages.

\* cited by examiner

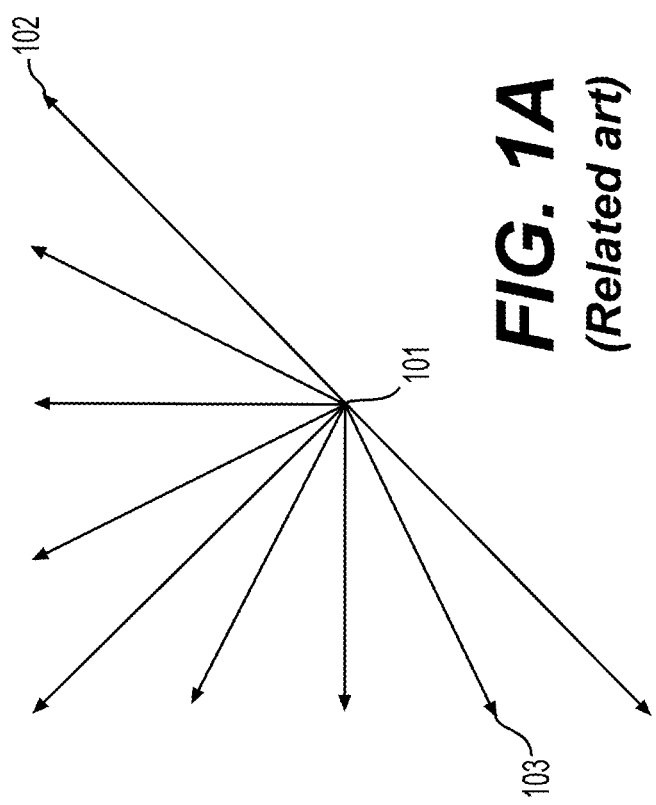
FIG. 1A *(Related art)*

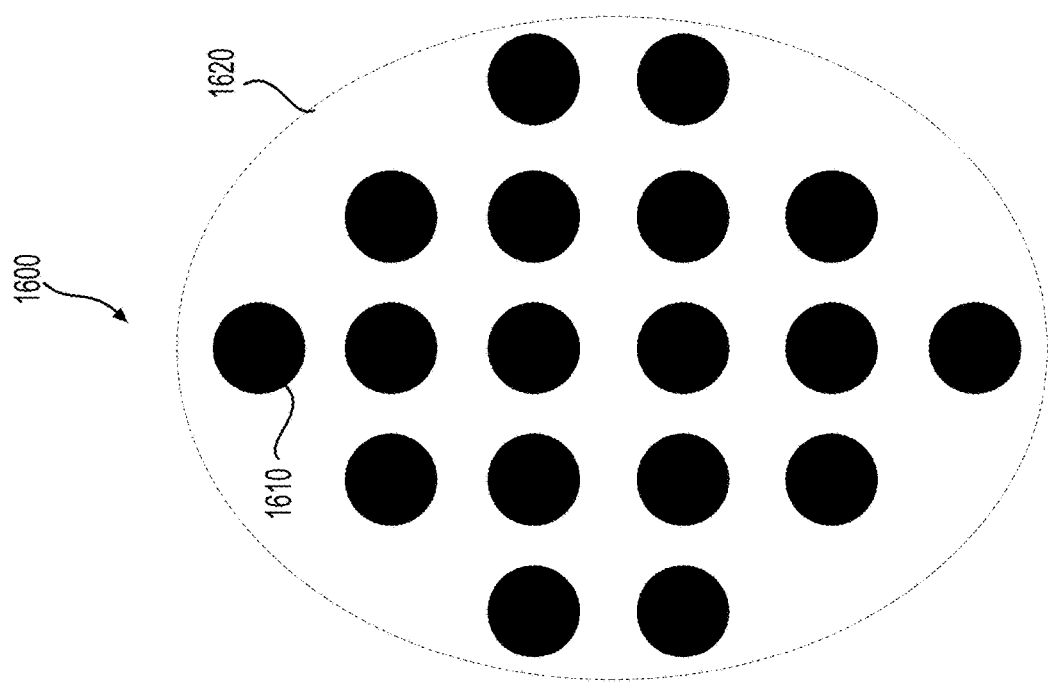

| | |
|---|---|
| if ( slice_cross_component_alf_cb_enabled_flag ) | |
| alf_ctb_cross_component_cb_idc[ xCtb >> CtbLog2SizeY ][ yCtb >> CtbLog2SizeY ] | ae(v) |
| if( slice_cross_component_alf_cb_enabled_flag == 0 \|\| alf_ctb_cross_component_cb_idc[ xCtb >> CtbLog2SizeY ][ yCtb >> CtbLog2SizeY ] == 0 ) | |
| if( slice_alf_chroma_idc == 1 \|\| slice_alf_chroma_idc == 3 ) { | |
| alf_ctb_flag[ 1 ][ xCtb >> CtbLog2SizeY ][ yCtb >> CtbLog2SizeY ] | ae(v) |
| if( alf_ctb_flag[ 1 ][ xCtb >> CtbLog2SizeY ][ yCtb >> CtbLog2SizeY ] && aps_alf_chroma_num_alt_filters_minus1 > 0 ) | |
| alf_ctb_filter_alt_idx[ 0 ][ xCtb >> CtbLog2SizeY ][ yCtb >> CtbLog2SizeY ] | ae(v) |
| } | |
| if ( slice_cross_component_alf_cr_enabled_flag ) | |
| alf_ctb_cross_component_cr_idc[ xCtb >> CtbLog2SizeY ][ yCtb >> CtbLog2SizeY ] | ae(v) |
| if( slice_cross_component_alf_cr_enabled_flag == 0 \|\| alf_ctb_cross_component_cr_idc[ xCtb >> CtbLog2SizeY ][ yCtb >> CtbLog2SizeY ] == 0 ) | |
| if( slice_alf_chroma_idc == 2 \|\| slice_alf_chroma_idc == 3 ) { | |
| alf_ctb_flag[ 2 ][ xCtb >> CtbLog2SizeY ][ yCtb >> CtbLog2SizeY ] | ae(v) |
| if( alf_ctb_flag[ 2 ][ xCtb >> CtbLog2SizeY ][ yCtb >> CtbLog2SizeY ] && aps_alf_chroma_num_alt_filters_minus1 > 0 ) | |
| alf_ctb_filter_alt_idx[ 1 ][ xCtb >> CtbLog2SizeY ][ yCtb >> CtbLog2SizeY ] | ae(v) |
| } | |

FIG. 17

| SAO Type | Sample Adaptive Offset Type to be used | Number of categories |
|---|---|---|
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | central bands band offset | 16 |
| 6 | side bands band offset | 16 |

FIG. 21

| Category | Condition |
|---|---|
| 1 | c < 2 neighbors |
| 2 | c < 1 neighbor && c == 1 neighbor |
| 3 | c > 1 neighbor && c == 1 neighbor |
| 4 | c > 2 neighbors |
| 0 | None of the above |

FIG. 23

| | Descriptor |
|---|---|
| sao_offset_vlc( rx, ry, cIdx ) { | |
|   sao_type_idx[ cIdx ][ rx ][ ry ] | ue(v) |
|   if( sao_type_idx[ cIdx ][ rx ][ ry ] = =5 ) { | |
|     sao_band_position[ cIdx ][ rx ][ ry ] | u(5) |
|     for( i = 0; i < 4; i++ ) | |
|       sao_offset[ cIdx ][ rx][ ry ][ i ] | se(v) |
|   } else if( sao_type_idx[ cIdx ][ rx ][ ry ] != 0 ) | |
|     for( i = 0; i < 4; i++ ) | |
|       sao_offset[ cIdx ][ rx][ ry ][ i ] | ue(v) |
| } | |

| Combination | d0 | d1 | d2 | d3 | Offset |
|---|---|---|---|---|---|
| 0 | -1 | -1 | -1 | -1 | s0 |
| 1 | -1 | -1 | -1 | 0 | s1 |
| 2 | -1 | -1 | -1 | 1 | s2 |
| 3 | -1 | -1 | 0 | -1 | s3 |
| 4 | -1 | -1 | 0 | 0 | s4 |
| 5 | -1 | -1 | 0 | 1 | s5 |
| 6 | -1 | -1 | 1 | -1 | s6 |
| 7 | -1 | -1 | 1 | 0 | s7 |
| 8 | -1 | -1 | 1 | 1 | s8 |
| 9 | -1 | 0 | -1 | -1 | s9 |
| 10 | -1 | 0 | -1 | 0 | s10 |
| 11 | -1 | 0 | -1 | 1 | s11 |
| 12 | -1 | 0 | 0 | -1 | s12 |
| 13 | -1 | 0 | 0 | 0 | s13 |
| 14 | -1 | 0 | 0 | 1 | s14 |
| 15 | -1 | 0 | 1 | -1 | s15 |
| 16 | -1 | 0 | 1 | 0 | s16 |
| 17 | -1 | 0 | 1 | 1 | s17 |
| 18 | -1 | 1 | -1 | -1 | s18 |
| 19 | -1 | 1 | -1 | 0 | s19 |
| 20 | -1 | 1 | -1 | 1 | s20 |
| 21 | -1 | 1 | 0 | -1 | s21 |
| 22 | -1 | 1 | 0 | 0 | s22 |
| 23 | -1 | 1 | 0 | 1 | s23 |
| 24 | -1 | 1 | 1 | -1 | s24 |
| 25 | -1 | 1 | 1 | 0 | s25 |
| 26 | -1 | 1 | 1 | 1 | s26 |

*FIG. 27A*

| Combination | d0 | d1 | d2 | d3 | Offset |
|---|---|---|---|---|---|
| 27 | 0 | -1 | -1 | -1 | s27 |
| 28 | 0 | -1 | -1 | 0 | s28 |
| 29 | 0 | -1 | -1 | 1 | s29 |
| 30 | 0 | -1 | 0 | -1 | s30 |
| 31 | 0 | -1 | 0 | 0 | s31 |
| 32 | 0 | -1 | 0 | 1 | s32 |
| 33 | 0 | -1 | 1 | -1 | s33 |
| 34 | 0 | -1 | 1 | 0 | s34 |
| 35 | 0 | -1 | 1 | 1 | s35 |
| 36 | 0 | 0 | -1 | -1 | s36 |
| 37 | 0 | 0 | -1 | 0 | s37 |
| 38 | 0 | 0 | -1 | 1 | s38 |
| 39 | 0 | 0 | 0 | -1 | s39 |
| 40 | 0 | 0 | 0 | 0 | s40 |
| 41 | 0 | 0 | 0 | 1 | s41 |
| 42 | 0 | 0 | 1 | -1 | s42 |
| 43 | 0 | 0 | 1 | 0 | s43 |
| 44 | 0 | 0 | 1 | 1 | s44 |
| 45 | 0 | 1 | -1 | -1 | s45 |
| 46 | 0 | 1 | -1 | 0 | s46 |
| 47 | 0 | 1 | -1 | 1 | s47 |
| 48 | 0 | 1 | 0 | -1 | s48 |
| 49 | 0 | 1 | 0 | 0 | s49 |
| 50 | 0 | 1 | 0 | 1 | s50 |
| 51 | 0 | 1 | 1 | -1 | s51 |
| 52 | 0 | 1 | 1 | 0 | s52 |
| 53 | 0 | 1 | 1 | 1 | s53 |

| Combination | d0 | d1 | d2 | d3 | Offset |
|---|---|---|---|---|---|
| 54 | 1 | -1 | -1 | -1 | s54 |
| 55 | 1 | -1 | -1 | 0 | s55 |
| 56 | 1 | -1 | -1 | 1 | s56 |
| 57 | 1 | -1 | 0 | -1 | s57 |
| 58 | 1 | -1 | 0 | 0 | s58 |
| 59 | 1 | -1 | 0 | 1 | s59 |
| 60 | 1 | -1 | 1 | -1 | s60 |
| 61 | 1 | -1 | 1 | 0 | s61 |
| 62 | 1 | -1 | 1 | 1 | s62 |
| 63 | 1 | 0 | -1 | -1 | s63 |
| 64 | 1 | 0 | -1 | 0 | s64 |
| 65 | 1 | 0 | -1 | 1 | s65 |
| 66 | 1 | 0 | 0 | -1 | s66 |
| 67 | 1 | 0 | 0 | 0 | s67 |
| 68 | 1 | 0 | 0 | 1 | s68 |
| 69 | 1 | 0 | 1 | -1 | s69 |
| 70 | 1 | 0 | 1 | 0 | s70 |
| 71 | 1 | 0 | 1 | 1 | s71 |
| 72 | 1 | 1 | -1 | -1 | s72 |
| 73 | 1 | 1 | -1 | 0 | s73 |
| 74 | 1 | 1 | -1 | 1 | s74 |
| 75 | 1 | 1 | 0 | -1 | s75 |
| 76 | 1 | 1 | 0 | 0 | s76 |
| 77 | 1 | 1 | 0 | 1 | s77 |
| 78 | 1 | 1 | 1 | -1 | s78 |
| 79 | 1 | 1 | 1 | 0 | s79 |
| 80 | 1 | 1 | 1 | 1 | s80 |

*FIG. 27C*

METHOD AND APPARATUS FOR VIDEO FILTERING

INCORPORATION BY REFERENCE

This present application is a continuation of U.S. application Ser. No. 17/360,761, "METHOD AND APPARATUS FOR VIDEO FILTERING" filed on Jun. 28, 2021, which claims the benefit of priority to U.S. Provisional Application No. 63/126,423, "HARMONIZED SCHEME BETWEEN SEMI DECOUPLED PARTITIONING AND LOOP FILTER" filed on Dec. 16, 2020. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry determines decoupled coding information of a first color component and a second color component of a block based on decoded information in a coded video bitstream. Then, the processing circuitry reconstructs a first sample of the first color component at a location in the block based on a first loop filter configuration, and reconstructs a second sample of the second color component at the location in the block based on a second loop filter configuration that is different from the first loop filter configuration.

In some embodiments, the decoupled coding information includes an enabling/disabling difference of an intra block copy mode for a luma component and a chroma component. In some embodiments, the decoupled coding information includes decoupled partitioning structures for the luma component and the chroma component.

In some embodiments, the processing circuitry enables at least one of a de-blocking filter, a constrained directional enhancement filter (CDEF), a loop restoration filter, a local sample offset (LSO) filter and a cross-component sample offset (CCSO) filter in one of the first loop filter configuration and the second loop filter configuration; and disables the de-blocking filter, the constrained directional enhancement filter (CDEF), the loop restoration filter, a local sample offset (LSO) filter and the cross-component sample offset (CCSO) filter in another of the first loop filter configuration and the second loop filter configuration.

In an embodiment, the processing circuitry enables the de-blocking filter, the constrained directional enhancement filter (CDEF), the loop restoration filter, the local sample offset (LSO) filter and the cross-component sample offset (CCSO) filter in the second loop filter configuration associated with a chroma component in response to a disabling of an intra block copy mode for the chroma component and an enabling of the intra block copy mode for a luma component.

In another embodiment, the processing circuitry enables one of the local sample offset (LSO) filter and the cross-component sample offset (CCSO) filter in the second loop filter configuration associated with a chroma component in response to a disabling of an intra block copy mode for the chroma component and an enabling of the intra block copy mode for a luma component.

In another embodiment, the processing circuitry enables both of the constrained directional enhancement filter (CDEF), and the cross-component sample offset (CCSO) filter in the second loop filter configuration associated with a chroma component in response to a disabling of an intra block copy mode for the chroma component and an enabling of the intra block copy mode for a luma component.

In some examples, the processing circuitry determines the decoupled coding information for the first color component and the second color component in the block based on respective enabling/disabling signals for the first color component and the second color component of at least one of a block level, a video parameter set (VPS), a sequence parameter set (SPS), a picture parameter set (PPS), an adaptation parameter set (APS), a slice header, and a tile header.

In some examples, the processing circuitry decodes a first enabling/disabling flag associated with a luma component from the coded video bitstream, and decodes a second enabling/disabling flag associated with chroma components from the coded video bitstream. Then, the processing circuitry determines the decoupled coding information for the luma component and the chroma components based on the first enabling/disabling flag and the second enabling/disabling flag.

In some examples, the processing circuitry decodes a first enabling/disabling flag associated with a luma component from the coded video bitstream, decodes a second enabling/disabling flag associated with a first chroma component from the coded video bitstream and decode a third enabling/disabling flag associated with a second chroma component from the coded video bitstream. Then, the processing circuitry determines the decoupled coding information for the luma component, the first chroma component and the second chroma component based on the first enabling/disabling flag, the second enabling/disabling flag, and the third enabling/disabling flag.

In some embodiments, the processing circuitry decodes a flag associated with a specific loop filter from a higher level syntax than the block, and applies the specific loop filter to a luma component in response to the flag being true regardless of the decoupled coding information or an intra block copy mode.

Aspects of the disclosure also provide a non-transitory computer-readable medium storing instructions which when executed by a computer for video decoding cause the computer to perform any of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

FIGS. 10A-10D show examples of subsampled positions used for calculating gradients according to embodiments of the disclosure.

FIGS. 12A-12F show examples of symmetric padding operations at virtual boundaries according to embodiments of the disclosure.

FIG. 16 shows an example of a filter shape according to an embodiment of the disclosure.

FIG. 17 shows a syntax example for cross component filter according to some embodiments of the disclosure.

FIG. 21 shows a table of a plurality of sample adaptive offset (SAO) types according to an embodiment of the disclosure.

FIG. 23 shows a table for pixel classification rule for edge offset in some examples.

FIG. 24 shows an example of syntaxes that may be signaled.

FIGS. 27A-27C show a table having 81 combinations according to an embodiment of the disclosure.

DETAILED DESCRIPTION OF EMBODIMENTS

Figure 1B:
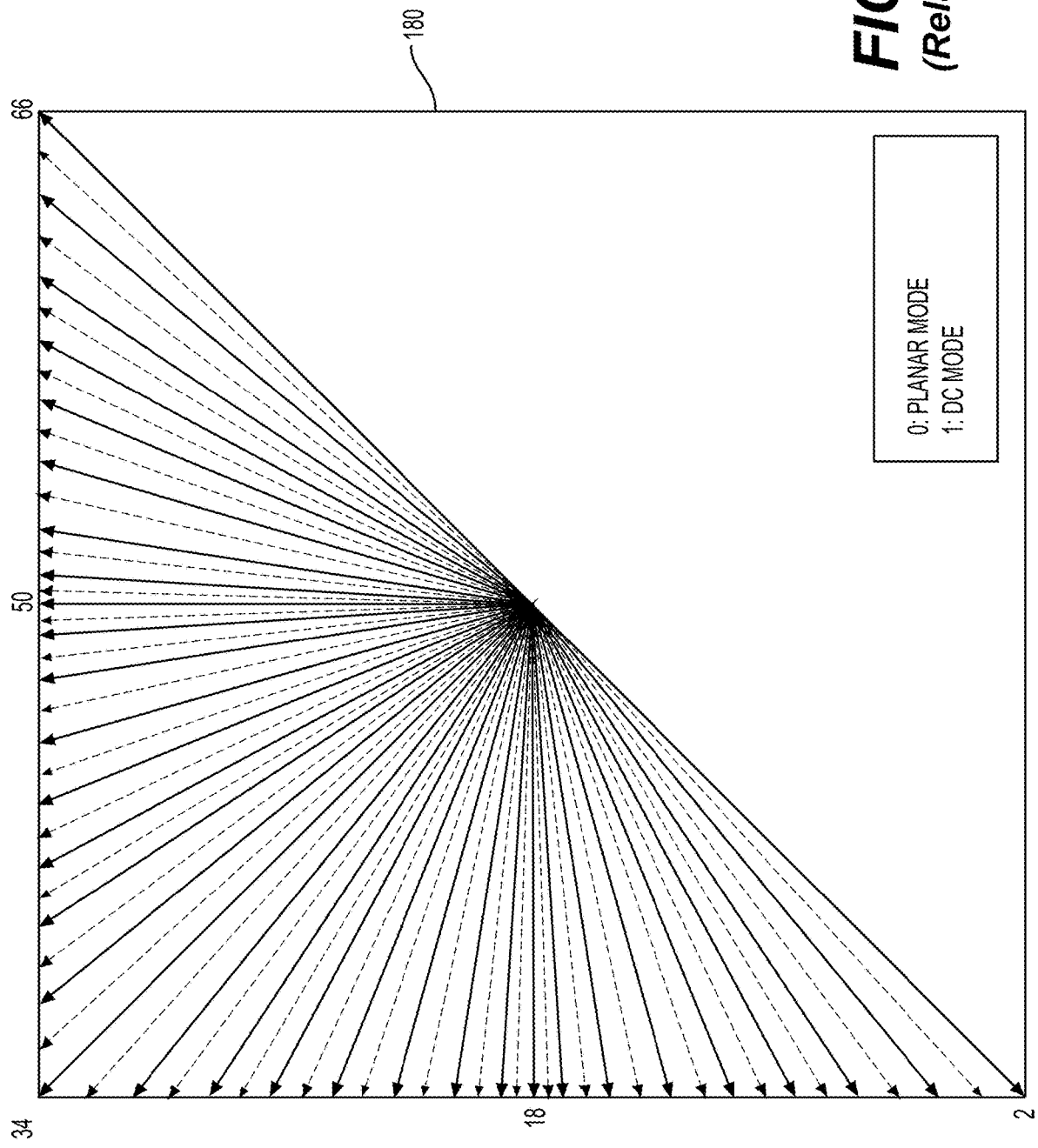
FIG. 1B is an illustration of exemplary intra prediction directions.
Figure 2:
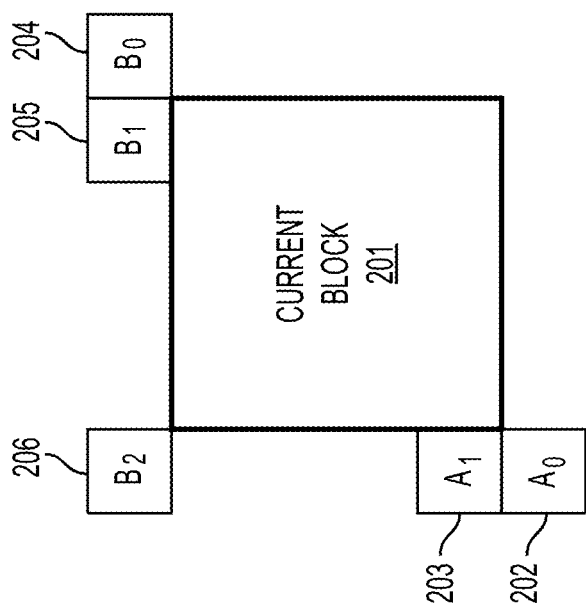
FIG. 2 is a schematic illustration of a current block and its surrounding spatial merge candidates in one example.
Figure 3:
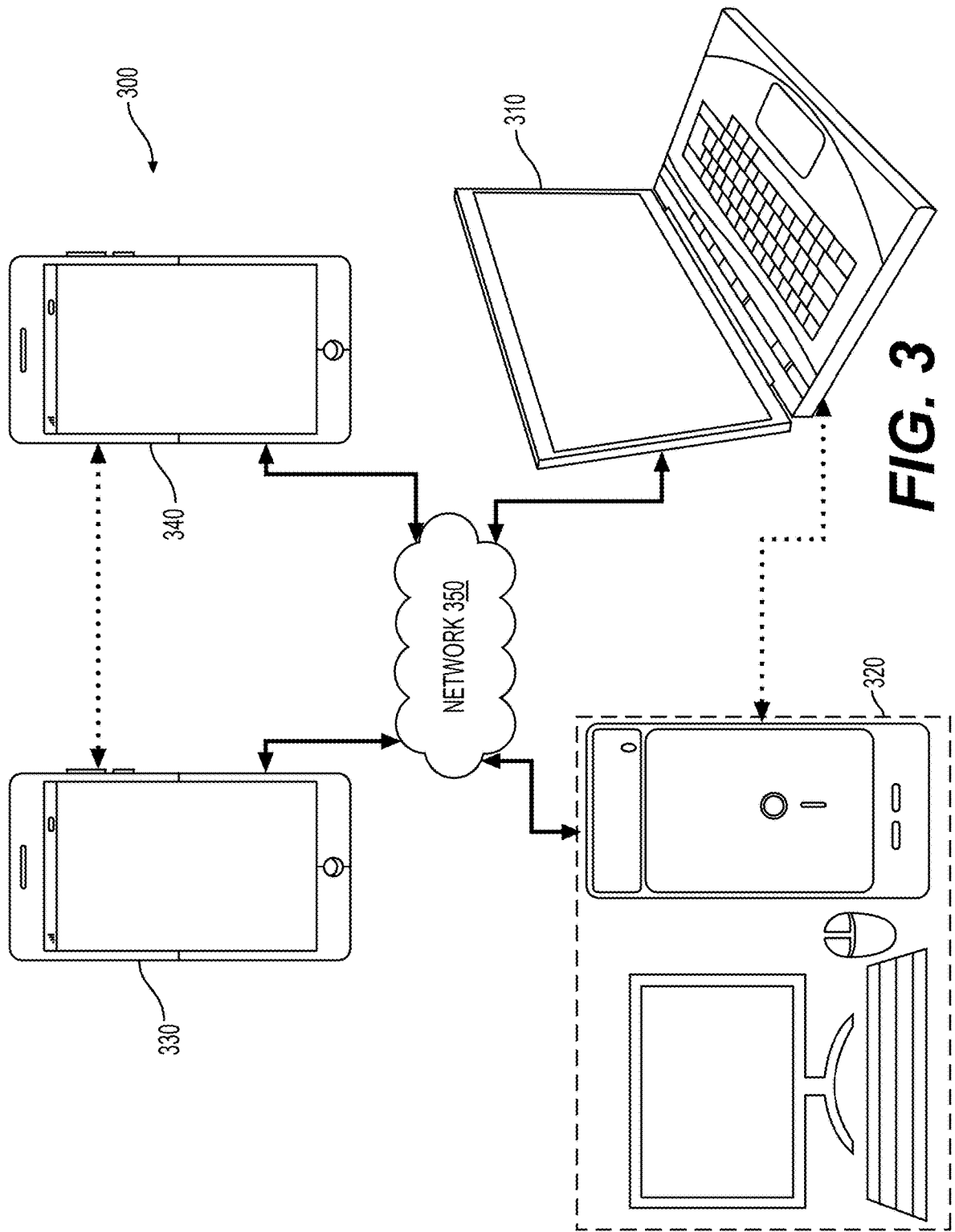
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
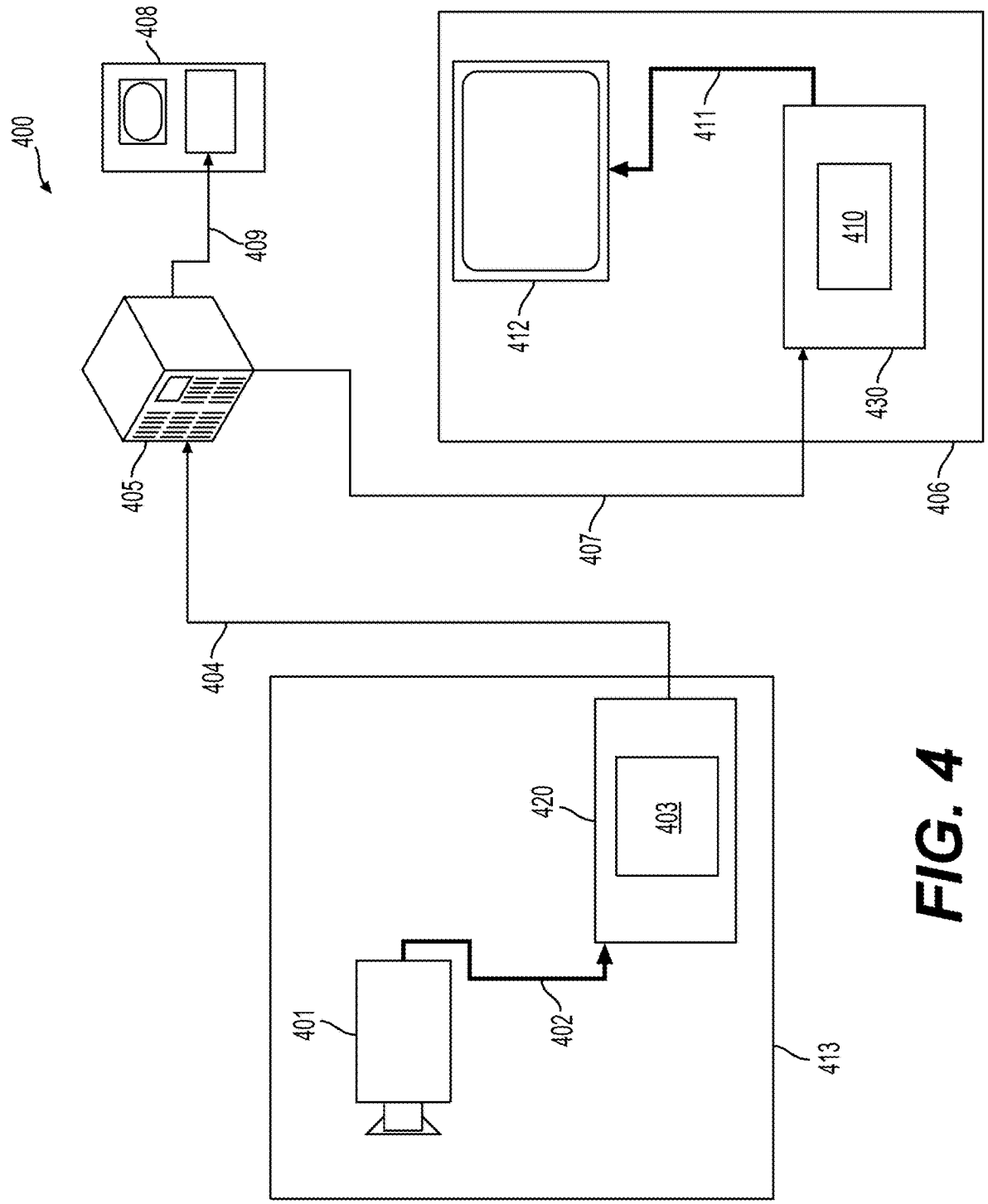
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
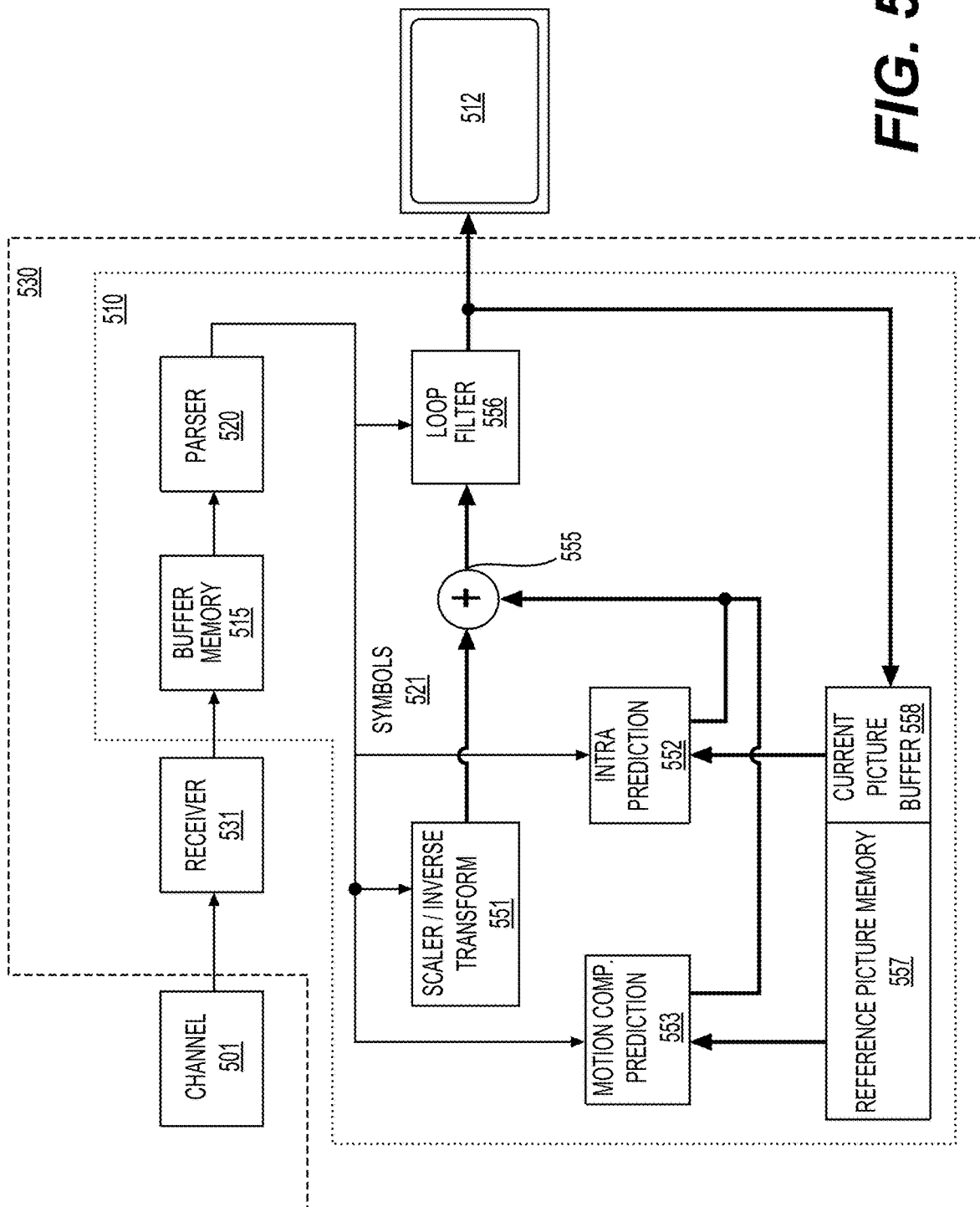
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531)

and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
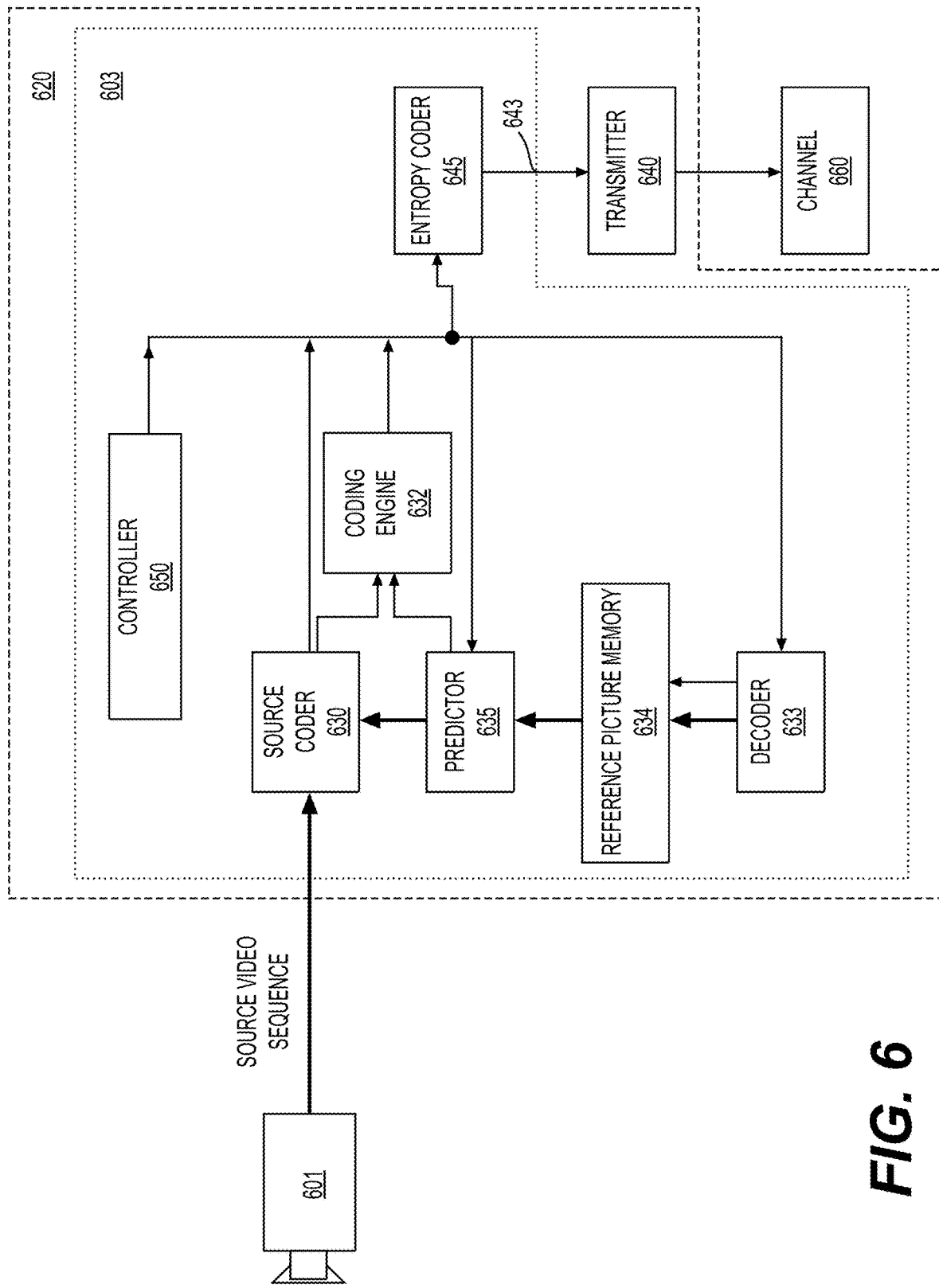
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
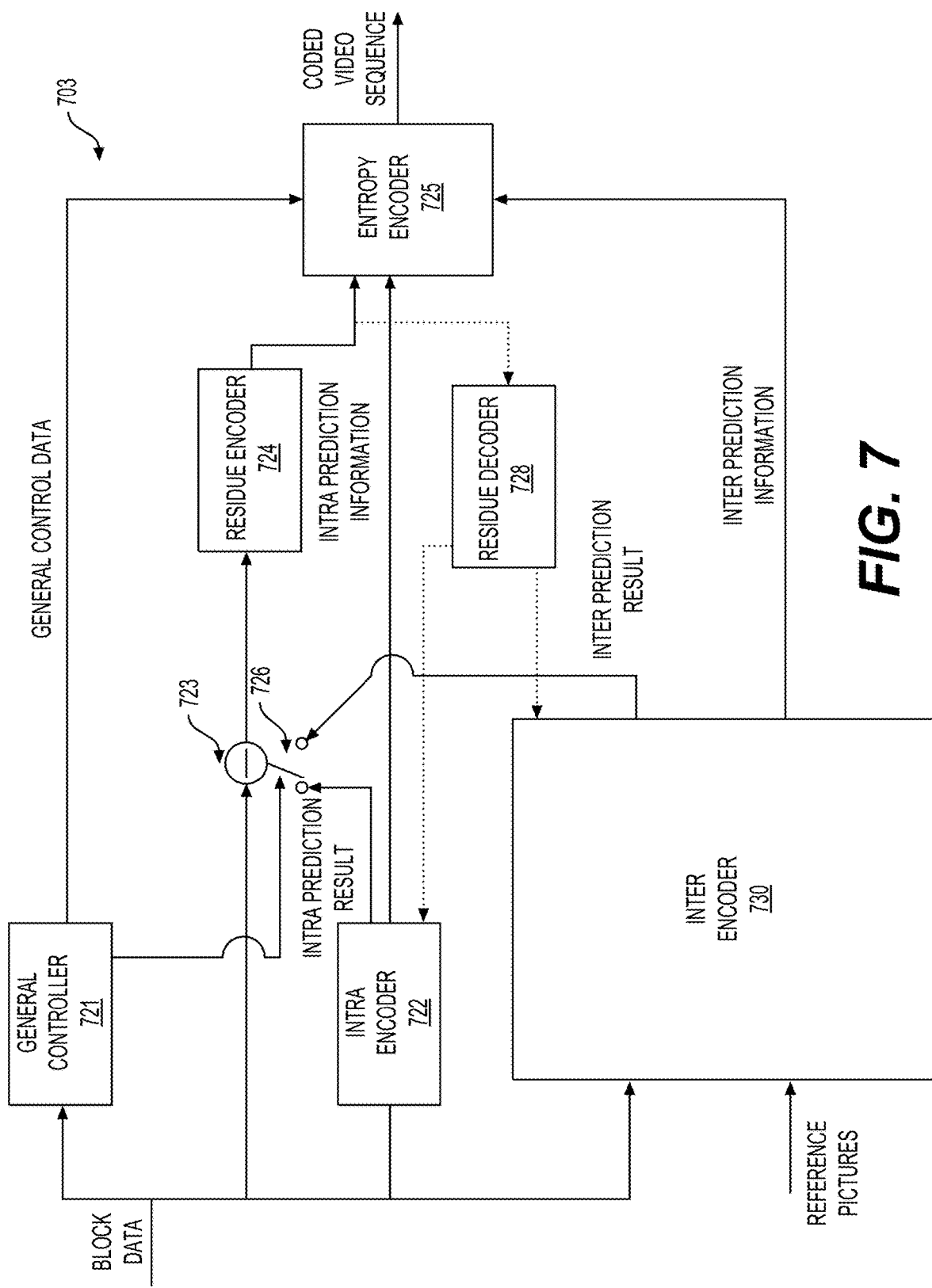
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
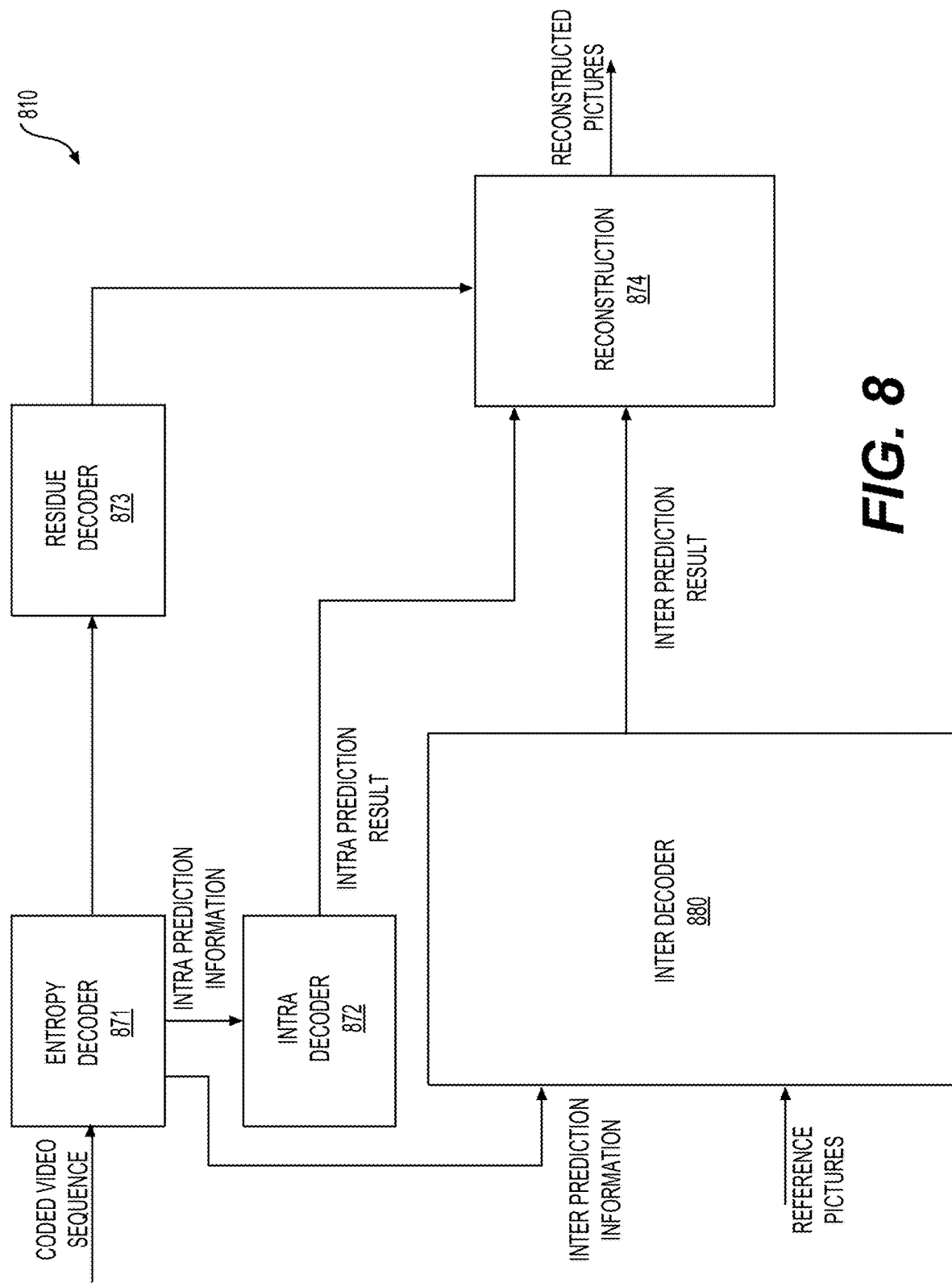
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure provide filtering techniques for video coding/decoding. Specifically, the filtering techniques are applied to a loop filter unit, such as the loop filter unit (556) in a prediction loop. For example, the filtered image by the loop filter unit (556) is stored in a buffer, such as the reference picture memory (557) as a reference for further prediction. A loop filter unit may apply various loop filters for sample filtering. In some examples, a loop filter configuration for a loop filter unit refers to the loop filters applied by the loop filter unit.

An adaptive loop filter (ALF) with block-based filter adaption can be applied by encoders/decoders to reduce artifacts. For a luma component, one of a plurality of filters (e.g., 25 filters) can be selected for a 4×4 luma block, for example, based on a direction and activity of local gradients.

Figure 9:
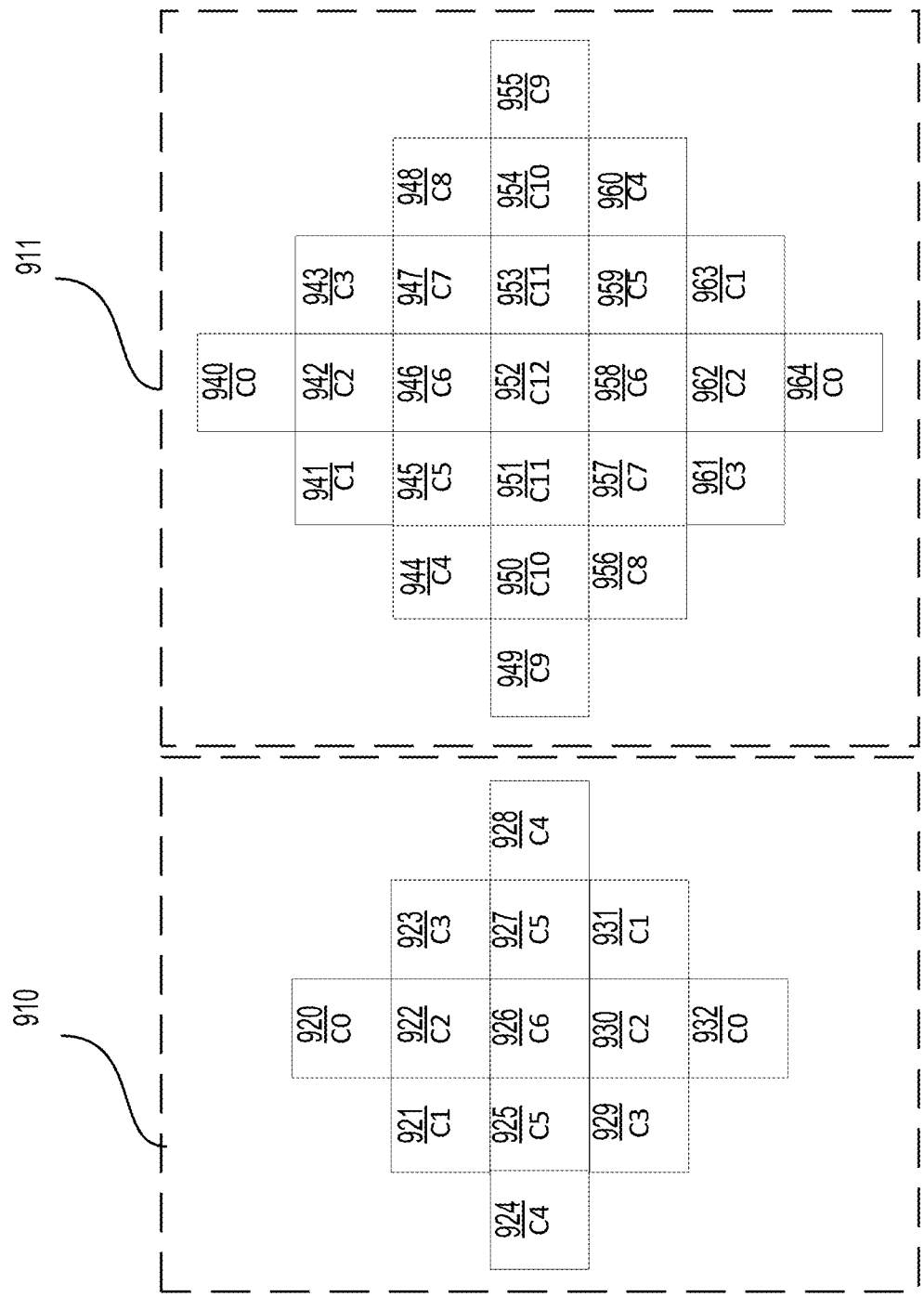
FIG. 9 shows examples of filter shapes according to embodiments of the disclosure.

An ALF can have any suitable shape and size. Referring to FIG. 9, ALFs (910)-(911) have a diamond shape, such as a 5×5 diamond-shape for the ALF (910) and a 7×7 diamond-shape for the ALF (911). In the ALF (910), elements (920)-(932) form a diamond shape and can be used in the filtering process. Seven values (e.g., C0-C6) can be used for the elements (920)-(932). In the ALF (911), elements (940)-(964) forms a diamond shape and can be used in the filtering process. Thirteen values (e.g., C0-C12) can be used for the elements (940)-(964).

Referring to FIG. 9, in some examples, the two ALFs (910)-(911) with the diamond filter shape are used. The 5×5 diamond-shaped filter (910) can be applied for chroma components (e.g., chroma blocks, chroma CBs), and the 7×7 diamond-shaped filter (911) can be applied for a luma component (e.g., a luma block, a luma CB). Other suitable shape(s) and size(s) can be used in the ALF. For example, a 9×9 diamond-shaped filter can be used.

Filter coefficients at locations indicated by the values (e.g., C0-C6 in (910) or C0-C12 in (920)) can be non-zero. Further, when the ALF includes a clipping function, clipping values at the locations can be non-zero.

For block classification of a luma component, a 4×4 block (or luma block, luma CB) can be categorized or classified as one of multiple (e.g., 25) classes. A classification index C can be derived based on a directionality parameter D and a quantized value A of an activity value A using Eq. (1).

$$C = 5D + \hat{A} \qquad \text{Eq. (1)}$$

To calculate the directionality parameter D and the quantized value $\hat{A}$, gradients $g_v$, $g_h$, $g_{d1}$, and $g_{d2}$ of a vertical, a horizontal, and two diagonal directions (e.g., d1 and d2), respectively, can be calculated using 1-D Laplacian as follows.

$$g_v = \Sigma_{k=i-2}^{i+3} \Sigma_{l=j-2}^{j+3} V_{k,l}, \; V_{k,l} = |2R(k,l) - R(k,l-1) - R(k,l+1)| \qquad \text{Eq. (2)}$$

$$g_h = \Sigma_{k=i-2}^{i+3} \Sigma_{l=j-2}^{j+3} H_{k,l}, \; H_{k,l} = |2R(k,l) - R(k-1,l) - R(k+1,l)| \qquad \text{Eq. (3)}$$

$$g_{d1} = \Sigma_{k=i-2}^{i+3} \Sigma_{l=j-2}^{j+3} D1_{k,l}, \; D1_{k,l} = |2R(k,l) - R(k-1,l-1) - R(k+1,l+1)| \qquad \text{Eq. (4)}$$

$$g_{d2} = \Sigma_{k=i-2}^{i+3} \Sigma_{l=j-2}^{j+3} D2_{k,l}, \; D2_{k,l} = |2R(k,l) - R(k-1,l+1) - R(k+1,l-1)| \qquad \text{Eq. (5)}$$

where indices i and j refer to coordinates of an upper left sample within the 4×4 block and R(k,l) indicates a reconstructed sample at a coordinate (k,l). The directions (e.g., d1 and d2) can refer to 2 diagonal directions.

Figures 10A, 10B:
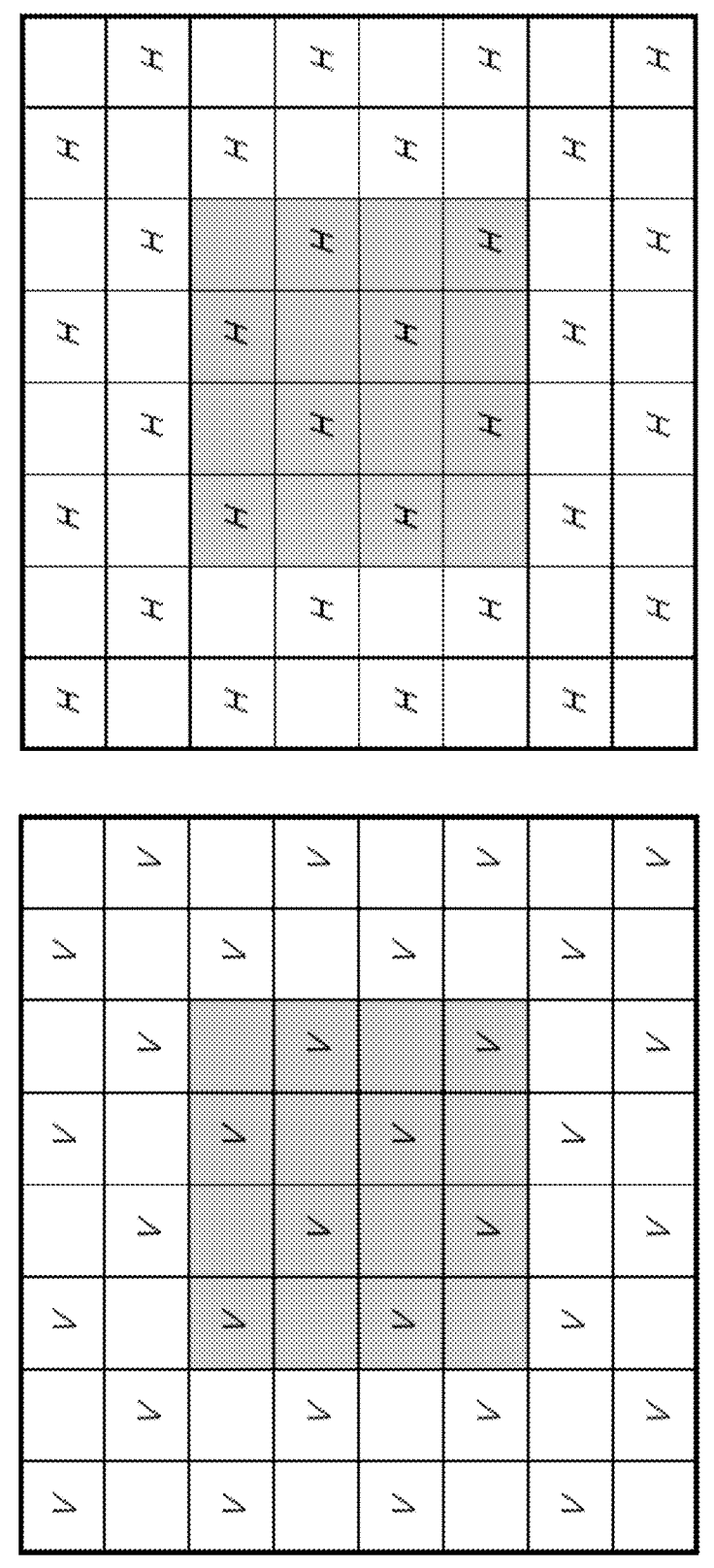
Figures 10C, 10D:
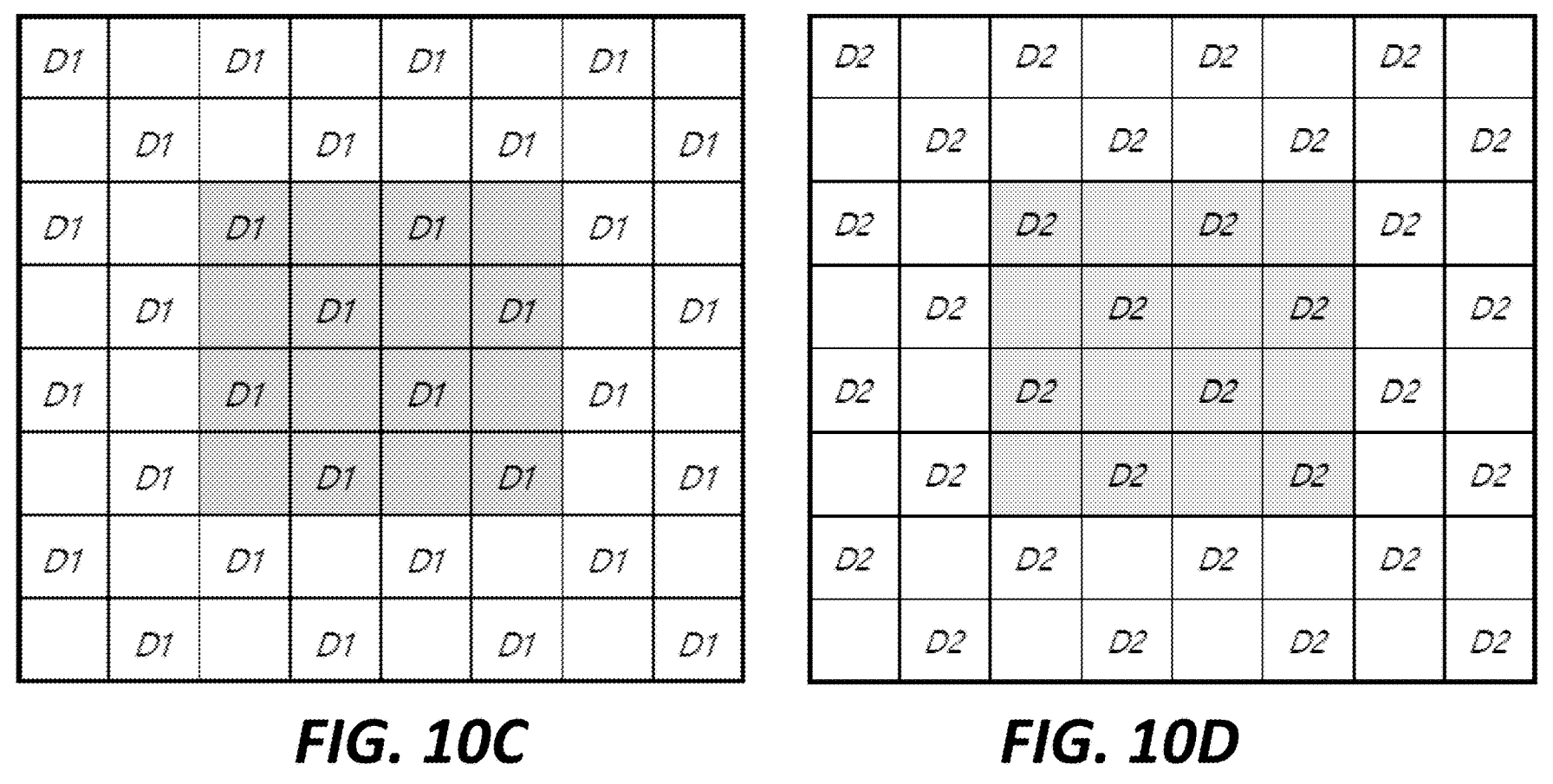

To reduce complexity of the block classification described above, a subsampled 1-D Laplacian calculation can be applied. FIGS. 10A-10D show examples of subsampled positions used for calculating the gradients $g_v$, $g_h$, $g_{d1}$, and $g_{d2}$ of the vertical (FIG. 10A), the horizontal (FIG. 10B), and the two diagonal directions d1 (FIG. 10C) and d2 (FIG. 10D), respectively. The same subsampled positions can be used for gradient calculation of the different directions. In FIG. 10A, labels 'V' show the subsampled positions to calculate the vertical gradient $g_v$. In FIG. 10B, labels 'H' show the subsampled positions to calculate the horizontal gradient $g_h$. In FIG. 10C, labels 'D1' show the subsampled positions to calculate the d1 diagonal gradient $g_{d1}$. In FIG. 10D, labels 'D2' show the subsampled positions to calculate the d2 diagonal gradient $g_{d2}$.

A maximum value $g_{h,v}^{max}$ and a minimum value $g_{h,v}^{min}$ of the gradients of horizontal and vertical directions $g_v$ and $g_h$ can be set as:

$$g_{h,v}^{max} = \max(g_h, g_v),\ g_{h,v}^{min} = \min(g_h, g_v) \quad \text{Eq. (6)}$$

A maximum value $g_{d1,d2}^{max}$ and a minimum value $g_{d1,d2}^{min}$ of the gradients of two diagonal directions $g_{d1}$ and $g_{d2}$ can be set as:

$$g_{d1,d2}^{max} = \max(g_{d1}, g_{d2}),\ g_{d1,d2}^{min} = \min(g_{d1}, g_{d2}) \quad \text{Eq. (7)}$$

The directionality parameter D can be derived based on the above values and two thresholds $t_1$ and $t_2$ as below.

Step 1. If (1) $g_{h,v}^{max} \leq t_1 \cdot g_{h,v}^{min}$ and (2) $g_{d1,d2}^{max} \leq t_1 \cdot g_{d1,d2}^{min}$ are true, D is set to 0.

Step 2. If $g_{h,v}^{max}/g_{h,v}^{min} > g_{d1,d2}^{max}/g_{d1,d2}^{min}$, continue to Step 3; otherwise continue to Step 4.

Step 3. If $g_{h,v}^{max} > t_2 \cdot g_{h,v}^{min}$, D is set to 2; otherwise D is set to 1.

Step 4. If $g_{d1,d2}^{max} > t_2 \cdot g_{d1,d2}^{min}$, D is set to 4; otherwise D is set to 3.

The activity value A can be calculated as:

$$A = \sum_{k=i-2}^{i+3} \sum_{l=j-2}^{j+3} (V_{k,l} + H_{k,l}) = g_v + g_h \quad \text{Eq. (8)}$$

A can be further quantized to a range of 0 to 4, inclusively, and the quantized value is denoted as Â.

For chroma components in a picture, no block classification is applied, and thus a single set of ALF coefficients can be applied for each chroma component.

Geometric transformations can be applied to filter coefficients and corresponding filter clipping values (also referred to as clipping values). Before filtering a block (e.g., a 4×4 luma block), geometric transformations such as rotation or diagonal and vertical flipping can be applied to the filter coefficients f(k,l) and the corresponding filter clipping values c(k,l), for example, depending on gradient values (e.g., $g_v$, $g_h$, $g_{d1}$, and/or $g_{d2}$) calculated for the block. The geometric transformations applied to the filter coefficients f(k,l) and the corresponding filter clipping values c(k,l) can be equivalent to applying the geometric transformations to samples in a region supported by the filter. The geometric transformations can make different blocks to which an ALF is applied more similar by aligning the respective directionality.

Three geometric transformations, including a diagonal flip, a vertical flip, and a rotation can be performed as described by Eqs. (9)-(11), respectively.

$$f_D(k,l) = f(l,k),\ c_D(k,l) = c(l,k), \quad \text{Eq. (9)}$$

$$f_V(k,l) = f(k, K-l-1),\ c_V(k,l) = c(k, K-l-1) \quad \text{Eq. (10)}$$

$$f_R(k,l) = f(K-l-1, k),\ c_R(k,l) = c(K-l-1, k) \quad \text{Eq. (11)}$$

where K is a size of the ALF or the filter, and $0 \leq k, l \leq K-1$ are coordinates of coefficients. For example, a location (0,0) is at an upper left corner and a location (K-1, K-1) is at a lower right corner of the filter f or a clipping value matrix (or clipping matrix) c. The transformations can be applied to the filter coefficients f(k, l) and the clipping values c(k,l) depending on the gradient values calculated for the block. An example of a relationship between the transformation and the four gradients are summarized in Table 1.

TABLE 1

Mapping of the gradient calculated for a block and the transformation

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal flip |
| $g_{d1} < g_{d2}$ and $g_h < g_v$ | Vertical flip |
| $g_{d1} < g_{d2}$ and $g_v < g_h$ | Rotation |

In some embodiments, ALF filter parameters are signaled in an Adaptation Parameter Set (APS) for a picture. In the APS, one or more sets (e.g., up to 25 sets) of luma filter coefficients and clipping value indexes can be signaled. In an example, a set of the one or more sets can include luma filter coefficients and one or more clipping value indexes. One or more sets (e.g., up to 8 sets) of chroma filter coefficients and clipping value indexes can be signaled. To reduce signaling overhead, filter coefficients of different classifications (e.g., having different classification indices) for luma components can be merged. In a slice header, indices of the APSs used for a current slice can be signaled.

In an embodiment, a clipping value index (also referred to as clipping index) can be decoded from the APS. The clipping value index can be used to determine a corresponding clipping value, for example, based on a relationship between the clipping value index and the corresponding clipping value. The relationship can be pre-defined and stored in a decoder. In an example, the relationship is described by a table, such as a luma table (e.g., used for a luma CB) of the clipping value index and the corresponding clipping value, a chroma table (e.g., used for a chroma CB) of the clipping value index and the corresponding clipping value. The clipping value can be dependent of a bit depth B. The bit depth B can refer to an internal bit depth, a bit depth of reconstructed samples in a CB to be filtered, or the like. In some examples, a table (e.g., a luma table, a chroma table) is obtained using Eq. (12).

$$AlfClip = \left\{ \text{round}\left(2^{B\frac{N-n+1}{N}}\right) \text{ for } n \in [1 \ldots N] \right\}, \quad \text{Eq. (12)}$$

where AlfClip is the clipping value, B is the bit depth (e.g., bitDepth), N (e.g., N=4) is a number of allowed clipping values, and (n−1) is the clipping value index (also referred to as clipping index or clipIdx). Table 2 shows an example of a table obtained using Eq. (12) with N=4. The clipping index (n−1) can be 0, 1, 2, and 3 in Table 2, and n can be 1, 2, 3, and 4, respectively. Table 2 can be used for luma blocks or chroma blocks.

TABLE 2

AlfClip can depend on the bit depth B and clipIdx

| bitDepth | clipIdx | | | |
|---|---|---|---|---|
| | 0 | 1 | 2 | 3 |
| 8 | 255 | 64 | 16 | 4 |
| 9 | 511 | 108 | 23 | 5 |
| 10 | 1023 | 181 | 32 | 6 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

In a slice header for a current slice, one or more APS indices (e.g., up to 7 APS indices) can be signaled to specify luma filter sets that can be used for the current slice. The filtering process can be controlled at one or more suitable levels, such as a picture level, a slice level, a CTB level, and/or the like. In an embodiment, the filtering process can be further controlled at a CTB level. A flag can be signaled to indicate whether the ALF is applied to a luma CTB. The luma CTB can choose a filter set among a plurality of fixed filter sets (e.g., 16 fixed filter sets) and the filter set(s) (also referred to as signaled filter set(s)) that are signaled in the APSs. A filter set index can be signaled for the luma CTB to indicate the filter set (e.g., the filter set among the plurality of fixed filter sets and the signaled filter set(s)) to be applied. The plurality of fixed filter sets can be pre-defined and hard-coded in an encoder and a decoder, and can be referred to as pre-defined filter sets.

For a chroma component, an APS index can be signaled in the slice header to indicate the chroma filter sets to be used for the current slice. At the CTB level, a filter set index can be signaled for each chroma CTB if there is more than one chroma filter set in the APS.

The filter coefficients can be quantized with a norm equal to 128. In order to decrease the multiplication complexity, a bitstream conformance can be applied so that the coefficient value of the non-central position can be in a range of $-2^7$ to $2^7-1$, inclusive. In an example, the central position coefficient is not signaled in the bitstream and can be considered as equal to 128.

In some embodiments, the syntaxes and semantics of clipping index and clipping values are defined as follows:

alf_luma_clip_idx[sfIdx][j] can be used to specify the clipping index of the clipping value to use before multiplying by the j-th coefficient of the signaled luma filter indicated by sfIdx. A requirement of bitstream conformance can include that the values of alf_luma_clip_idx[sfIdx][j] with sfIdx=0 to alf_luma_num_filters_signalled_minus1 and j=0 to 11 shall be in the range of 0 to 3, inclusive.

The luma filter clipping values AlfClipL[adaptation_parameter_set_id] with elements AlfClipL[adaptation_parameter_set_id][filtIdx][j], with filtIdx=0 to NumAlfFilters−1 and j=0 to 11 can be derived as specified in Table 2 depending on bitDepth set equal to BitDepthY and clipIdx set equal to alf_luma_clip_idx[alf_luma_coeff_delta_idx[filtIdx]][j].

alf_chroma_clip_idx[altIdx][j] can be used to specify the clipping index of the clipping value to use before multiplying by the j-th coefficient of the alternative chroma filter with index altIdx. A requirement of bitstream conformance can include that the values of alf_chroma_clip_idx[altIdx][j] with altIdx=0 to alf_chroma_num_alt_filters_minus1, j=0 to 5 shall be in the range of 0 to 3, inclusive.

The chroma filter clipping values AlfClipC[adaptation_parameter_set_id][altIdx] with elements AlfClipC[adaptation_parameter_set_id][altIdx][j], with altIdx=0 to alf_chroma_num_alt_filters_minus1, j=0 to 5 can be derived as specified in Table 2 depending on bitDepth set equal to BitDepthC and clipIdx set equal to alf_chroma_clip_idx[altIdx][j].

In an embodiment, the filtering process can be described as below. At a decoder side, when the ALF is enabled for a CTB, a sample R(i,j) within a CU (or CB) can be filtered, resulting in a filtered sample value R'(i,j) as shown below using Eq. (13). In an example, each sample in the CU is filtered.

$$R'(i, j) = R(i, j) + \left(\left(\sum_{k \neq 0} \sum_{l \neq 0} f(k, l) \times K(R(i+k, j+l) - R(i, j), c(k, l)) + 64\right) \gg 7\right) \quad \text{Eq. (13)}$$

where f(k,l) denotes the decoded filter coefficients, K(x, y) is a clipping function, and c(k, l) denotes the decoded clipping parameters (or clipping values). The variables k and l can vary between −L/2 and L/2 where L denotes a filter length. The clipping function K(x, y)=min (y, max(−y, x)) corresponds to a clipping function Clip3 (−y, y, x). By incorporating the clipping function K(x, y), the loop filtering method (e.g., ALF) becomes a non-linear process, and can be referred to a nonlinear ALF.

In the nonlinear ALF, multiple sets of clipping values can be provided in Table 3. In an example, a luma set includes four clipping values {1024, 181, 32, 6}, and a chroma set includes 4 clipping values {1024, 161, 25, 4}. The four clipping values in the luma set can be selected by approximately equally splitting, in a logarithmic domain, a full range (e.g., 1024) of the sample values (coded on 10 bits) for a luma block. The range can be from 4 to 1024 for the chroma set.

TABLE 3

Examples of clipping values

| | INTRA/INTER tile group |
|---|---|
| LUMA | {1024, 181, 32, 6} |
| CHROMA | {1024, 161, 25, 4} |

The selected clipping values can be coded in an "alf_data" syntax element as follows: a suitable encoding scheme (e.g., a Golomb encoding scheme) can be used to encode a clipping index corresponding to the selected clipping value such as shown in Table 3. The encoding scheme can be the same encoding scheme used for encoding the filter set index.

Figure 11A:
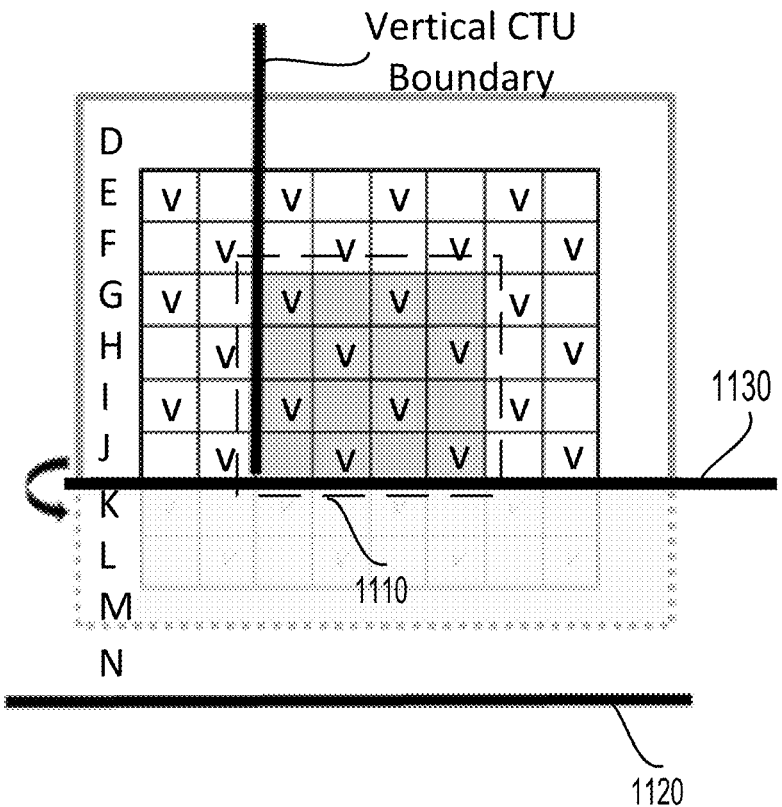
FIGS. 11A-11B show examples of a virtual boundary filtering process according to embodiments of the disclosure.

In an embodiment, a virtual boundary filtering process can be used to reduce a line buffer requirement of the ALF. Accordingly, modified block classification and filtering can be employed for samples near CTU boundaries (e.g., a horizontal CTU boundary). A virtual boundary (1130) can be defined as a line by shifting a horizontal CTU boundary (1120) by "$N_{samples}$" samples, as shown in FIG. 11A, where $N_{samples}$ can be a positive integer. In an example, $N_{samples}$ is equal to 4 for a luma component, and $N_{samples}$ is equal to 2 for a chroma component.

Figure 11B:
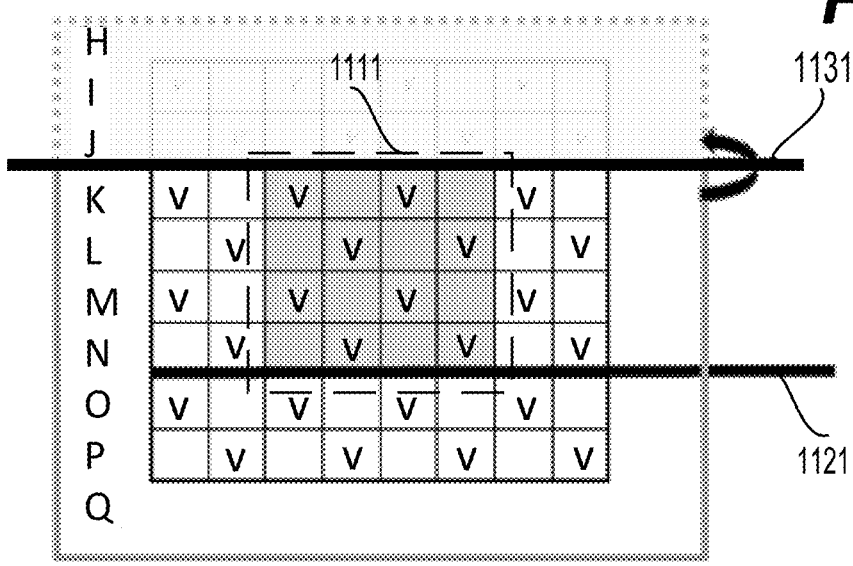

Referring to FIG. 11A, a modified block classification can be applied for a luma component. In an example, for the 1D Laplacian gradient calculation of a 4×4 block (1110) above the virtual boundary (1130), only samples above the virtual boundary (1130) are used. Similarly, referring to FIG. 11B, for a 1D Laplacian gradient calculation of a 4×4 block (1111) below a virtual boundary (1131) that is shifted from a CTU boundary (1121), only samples below the virtual boundary (1131) are used. The quantization of an activity value A can be accordingly scaled by taking into account a reduced number of samples used in the 1D Laplacian gradient calculation.

Figures 12A, 12B, 12C, 12D, 12E, 12F:
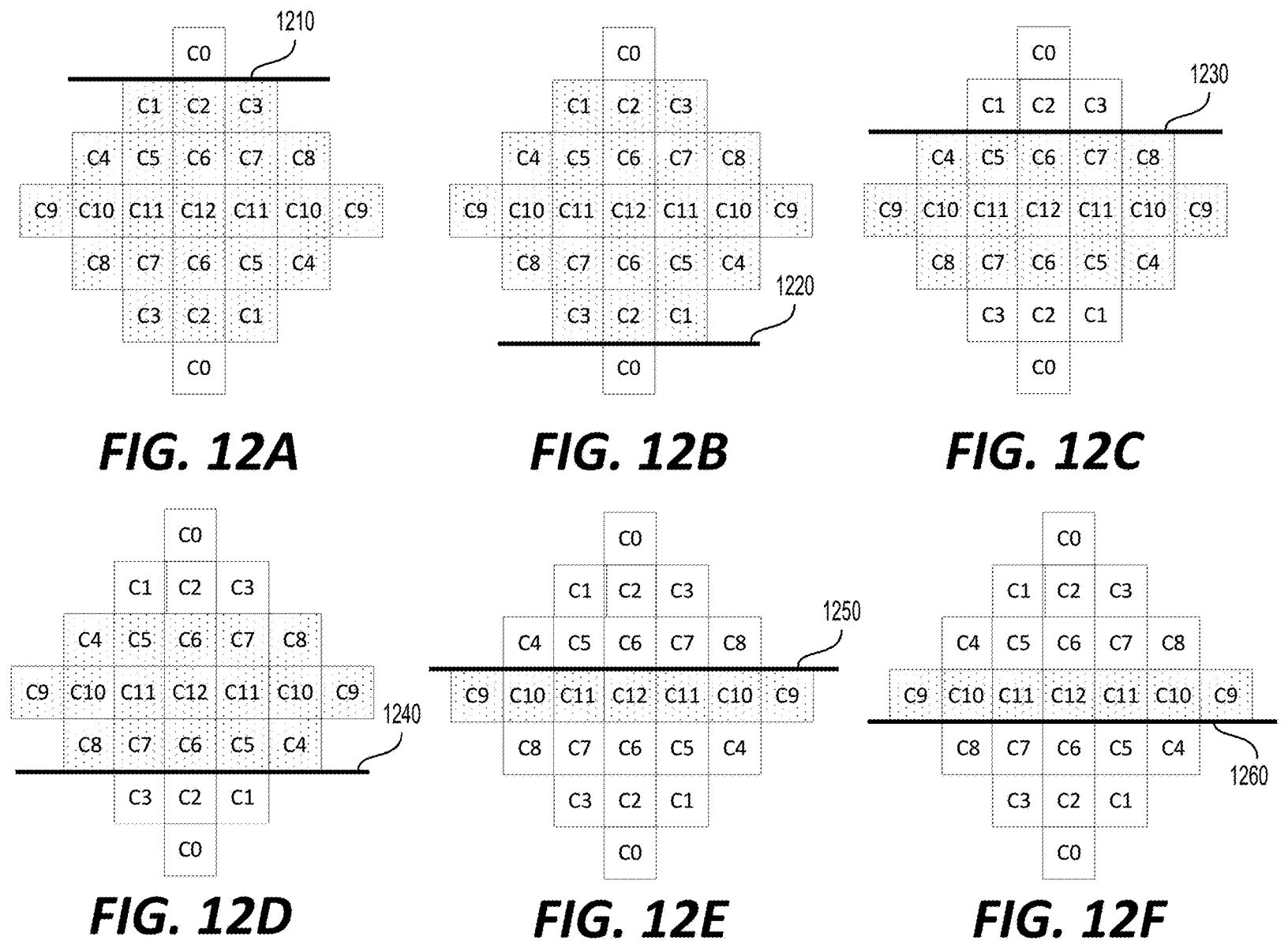

For a filtering processing, a symmetric padding operation at virtual boundaries can be used for both a luma component and a chroma component. FIGS. 12A-12F illustrate examples of such modified ALF filtering for a luma component at virtual boundaries. When a sample being filtered is located below a virtual boundary, neighboring samples that are located above the virtual boundary can be padded. When a sample being filtered is located above a virtual boundary, neighboring samples that are located below the virtual boundary can be padded. Referring to FIG. 12A, a neighboring sample C0 can be padded with a sample C2 that is located below a virtual boundary (1210). Referring to FIG. 12B, a neighboring sample C0 can be padded with a sample C2 that is located above a virtual boundary (1220). Referring to FIG. 12C, neighboring samples C1-C3 can be padded with samples C5-C7, respectively, that are located below a virtual boundary (1230). Referring to FIG. 12D, neighboring samples C1-C3 can be padded with samples C5-C7, respectively, that are located above a virtual boundary (1240). Referring to FIG. 12E, neighboring samples C4-C8 can be padded with samples C10, C11, C12, C11, and C10, respectively, that are located below a virtual boundary (1250). Referring to FIG. 12F, neighboring samples C4-C8 can be padded with samples C10, C11, C12, C11, and C10, respectively, that are located above a virtual boundary (1260).

In some examples, the above description can be suitably adapted when sample(s) and neighboring sample(s) are located to the left (or to the right) and to the right (or to the left) of a virtual boundary.

According to an aspect of the disclosure, in order to improve coding efficiency, pictures can be partitioned based on filtering process. In some examples, a CTU is also referred to as a largest coding unit (LCU). In an example, the CTU or LCU can have a size of 64×64 pixels. In some embodiments, LCU-Aligned picture quadtree splitting can be used for the filtering based partition. In some examples, the coding unit synchronous picture quadtree-based adaptive loop filter can be used. For example, the luma picture can be split into several multi-level quadtree partitions, and each partition boundary is aligned to the boundaries of the LCUs. Each partition has its own filtering process and thus be referred to as a filter unit (FU).

In some examples, a 2-pass encoding flow can be used. At a first pass of the 2-pass encoding flow, the quadtree split pattern of the picture and the best filter of each FU can be determined. In some embodiment, the determination of the quadtree split pattern of the picture and the determination of the best filters for FUs are based on filtering distortions. The filtering distortions can be estimated by fast filtering distortion estimation (FFDE) technique during the determination process. The picture is partitioned using quadtree partition. According to the determined quadtree split pattern and the selected filters of all FUs, the reconstructed picture can be filtered.

At a second pass of the 2-pass encoding flow, the CU synchronous ALF on/off control is performed. According to the ALF on/off results, the first filtered picture is partially recovered by the reconstructed picture.

Specifically, in some examples, a top-down splitting strategy is adopted to divide a picture into multi-level quadtree partitions by using a rate-distortion criterion. Each partition is called a filter unit (FU). The splitting process aligns quadtree partitions with LCU boundaries. The encoding order of FUs follows the z-scan order.

Figure 13:
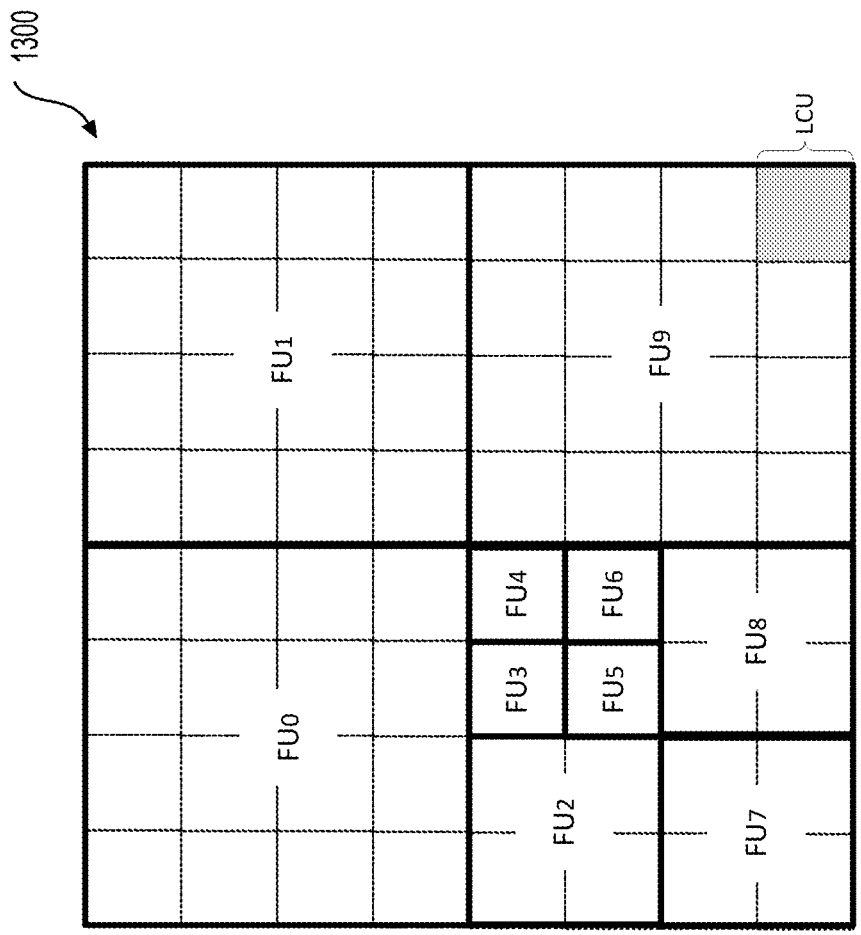
FIG. 13 shows a partition example of a picture according to some embodiments of the disclosure.

FIG. 13 shows a partition example according to some embodiments of the disclosure. In the FIG. 13 example, a picture (1300) is split into 10 FUs, and the encoding order is FU0, FU1, FU2, FU3, FU4, FU5, FU6, FU7, FU8, and FU9.

Figure 14:
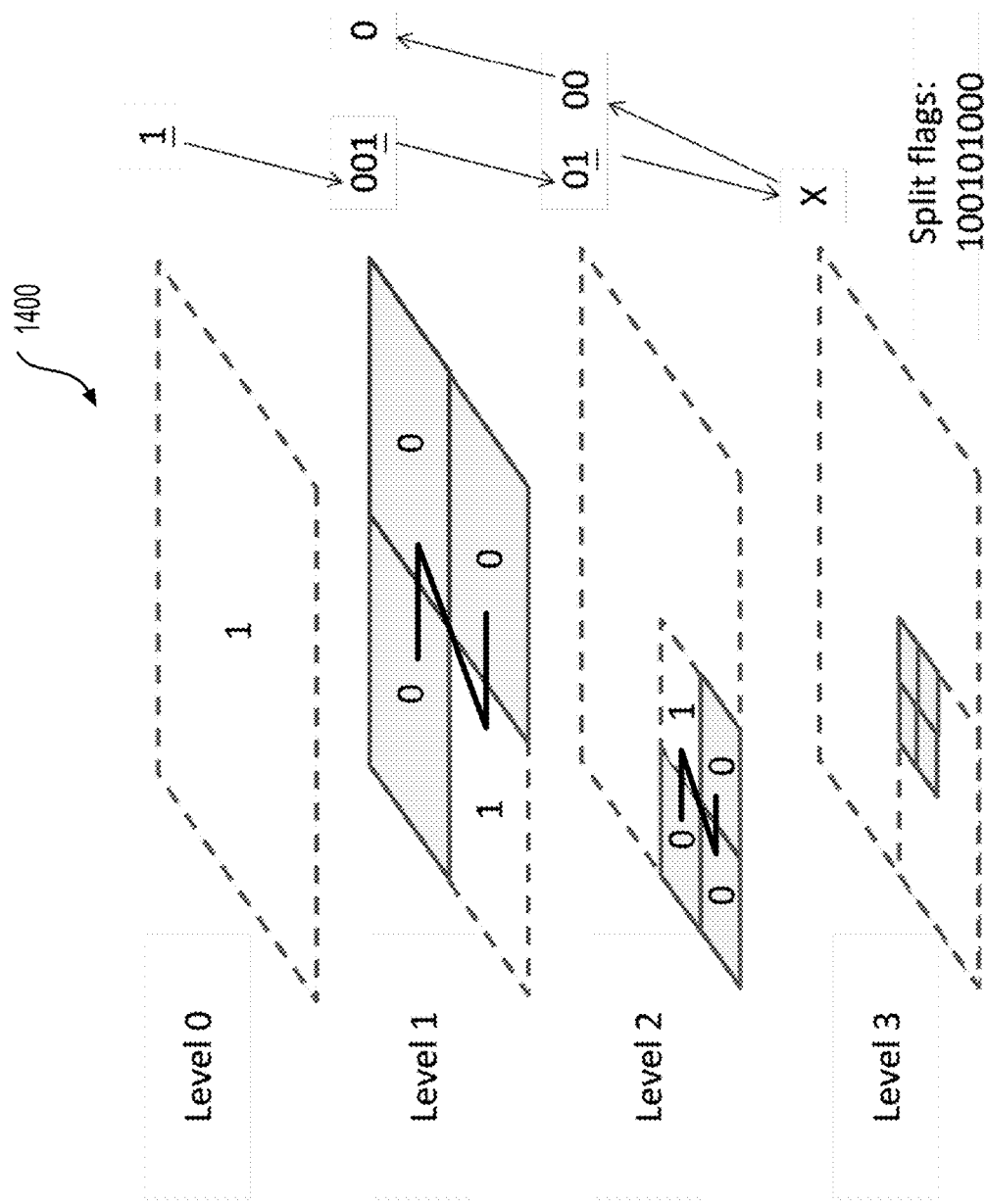
FIG. 14 shows a quadtree split pattern for a picture in some examples.

FIG. 14 shows a quadtree split pattern (1400) for the picture (1300). In the FIG. 14 example, split flags are used to indicate the picture partition pattern. For example, "1" indicates a quadtree partition is performed on the block; and "0" indicates that the block is not further partitioned. In some examples, a minimum size FU has the LCU size, and no split flag is needed for the minimum size FU. The split flags are encoded and transmitted in z-order as shown in FIG. 14.

In some examples, the filter of each FU is selected from two filter sets based on the rate-distortion criterion. The first set has ½-symmetric square-shaped and rhombus-shaped filters derived for the current FU. The second set comes from time-delayed filter buffers; the time-delayed filter buffers store the filters previously derived for FUs of prior pictures. The filter with the minimum rate-distortion cost of these two sets can be chosen for the current FU. Similarly, if the current FU is not the smallest FU and can be further split into 4 children FUs, the rate-distortion costs of the 4 children FUs are calculated. By comparing the rate-distortion cost of the split and non-split cases recursively, the picture quadtree split pattern can be decided.

In some examples, a maximum quadtree split level may be used to limit the maximum number of FUs. In an example, when the maximum quadtree split level is 2, the maximum number of FUs is 16. Further, during the quadtree split determination, the correlation values for deriving Wiener coefficients of the 16 FUs at the bottom quadtree level (smallest FUs) can be reused. The rest FUs can derive their Wiener filters from the correlations of the 16 FUs at the bottom quadtree level. Therefore, in the example, only one frame buffer access is performed for deriving the filter coefficients of all FUs.

After the quadtree split pattern is decided, to further reduce the filtering distortion, the CU synchronous ALF on/off control can be performed. By comparing the filtering distortion and non-filtering distortion at each leaf CU, the leaf CU can explicitly switch ALF on/off in its local region. In some examples, the coding efficiency may be further improved by redesigning the filter coefficients according to the ALF on/off results.

A cross-component filtering process can apply cross-component filters, such as cross-component adaptive loop filters (CC-ALFs). The cross-component filter can use luma sample values of a luma component (e.g., a luma CB) to refine a chroma component (e.g., a chroma CB corresponding to the luma CB). In an example, the luma CB and the chroma CB are included in a CU.

Figure 15:
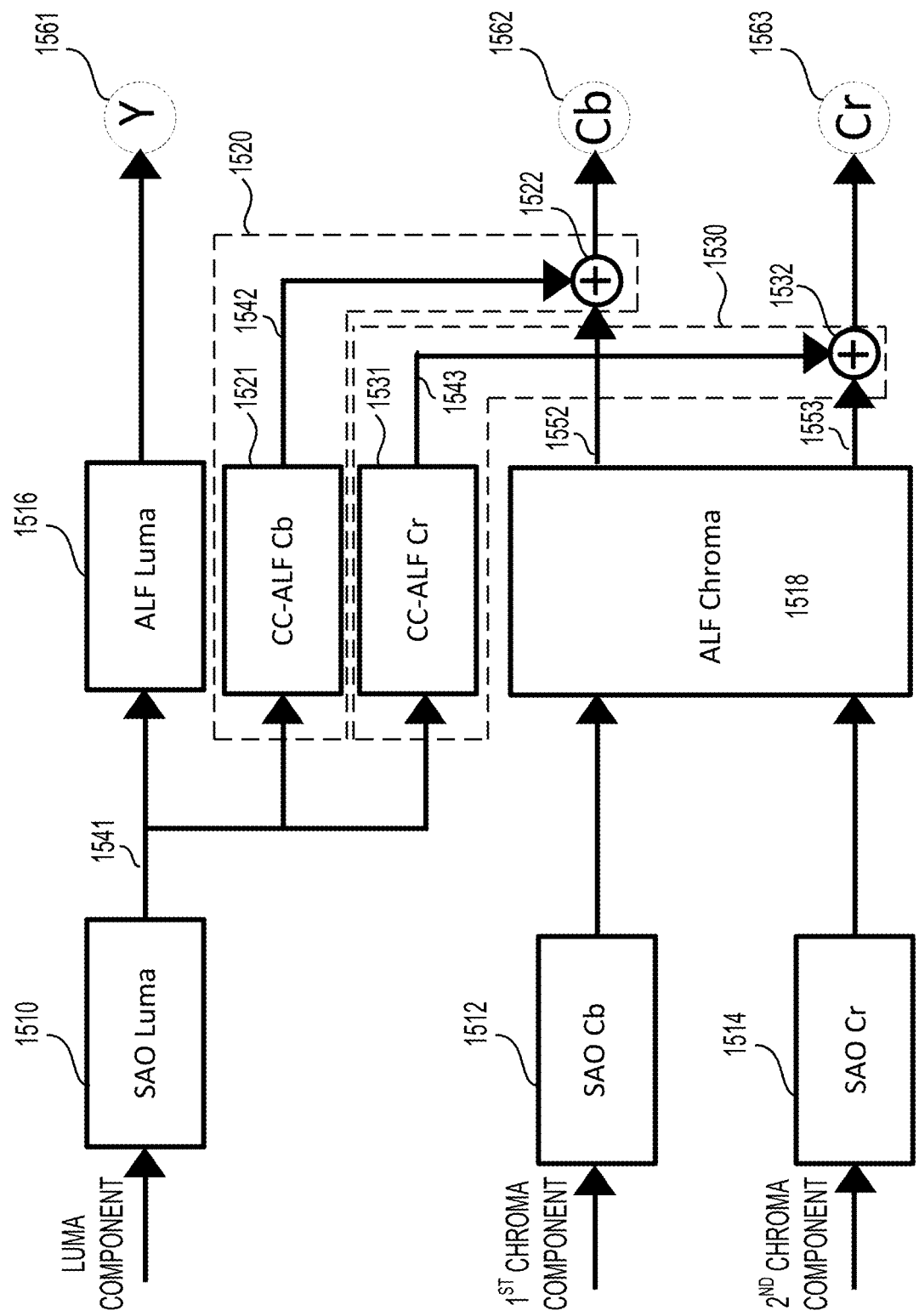
FIG. 15 shows cross-component filters according to an embodiment of the disclosure.

FIG. 15 shows cross-component filters (e.g., CC-ALFs) used to generate chroma components according to an embodiment of the disclosure. In some examples, FIG. 15 shows filtering processes for a first chroma component (e.g., a first chroma CB), a second chroma component (e.g., a second chroma CB), and a luma component (e.g., a luma CB). The luma component can be filtered by a sample adaptive offset (SAO) filter (1510) to generate a SAO filtered luma component (1541). The SAO filtered luma component (1541) can be further filtered by an ALF luma filter (1516) to become a filtered luma CB (1561) (e.g., 'Y').

The first chroma component can be filtered by a SAO filter (1512) and an ALF chroma filter (1518) to generate a first intermediate component (1552). Further, the SAO filtered luma component (1541) can be filtered by a cross-component filter (e.g., CC-ALF) (1521) for the first chroma component to generate a second intermediate component (1542). Subsequently, a filtered first chroma component (1562) (e.g., 'Cb') can be generated based on at least one of the second intermediate component (1542) and the first intermediate component (1552). In an example, the filtered first chroma component (1562) (e.g., 'Cb') can be generated by combining the second intermediate component (1542) and the first intermediate component (1552) with an adder (1522). The cross-component adaptive loop filtering process for the first chroma component can include a step performed by the CC-ALF (1521) and a step performed by, for example, the adder (1522).

The above description can be adapted to the second chroma component. The second chroma component can be filtered by a SAO filter (1514) and the ALF chroma filter (1518) to generate a third intermediate component (1553). Further, the SAO filtered luma component (1541) can be filtered by a cross-component filter (e.g., a CC-ALF) (1531) for the second chroma component to generate a fourth intermediate component (1543). Subsequently, a filtered second chroma component (1563) (e.g., 'Cr') can be generated based on at least one of the fourth intermediate component (1543) and the third intermediate component (1553). In an example, the filtered second chroma component (1563) (e.g., 'Cr') can be generated by combining the fourth intermediate component (1543) and the third intermediate component (1553) with an adder (1532). In an example, the cross-component adaptive loop filtering process for the second chroma component can include a step performed by the CC-ALF (1531) and a step performed by, for example, the adder (1532).

A cross-component filter (e.g., the CC-ALF (1521), the CC-ALF (1531)) can operate by applying a linear filter having any suitable filter shape to the luma component (or a luma channel) to refine each chroma component (e.g., the first chroma component, the second chroma component).

FIG. 16 shows an example of a filter (1600) according to an embodiment of the disclosure. The filter (1600) can include non-zero filter coefficients and zero filter coefficients. The filter (1600) has a diamond shape (1620) formed by filter coefficients (1610) (indicated by circles having black fill). In an example, the non-zero filter coefficients in the filter (1600) are included in the filter coefficients (1610), and filter coefficients not included in the filter coefficients (1610) are zero. Thus, the non-zero filter coefficients in the filter (1600) are included in the diamond shape (1620), and the filter coefficients not included in the diamond shape (1620) are zero. In an example, a number of the filter coefficients of the filter (1600) is equal to a number of the filter coefficients (1610), which is 18 in the example shown in FIG. 16.

The CC-ALF can include any suitable filter coefficients (also referred to as the CC-ALF filter coefficients). Referring back to FIG. 15, the CC-ALF (1521) and the CC-ALF (1531) can have a same filter shape, such as the diamond shape (1620) shown in FIG. 16, and a same number of filter coefficients. In an example, values of the filter coefficients in the CC-ALF (1521) are different from values of the filter coefficients in the CC-ALF (1531).

In general, filter coefficients (e.g., non-zero filter coefficients) in a CC-ALF can be transmitted, for example, in the APS. In an example, the filter coefficients can be scaled by a factor (e.g., $2^{10}$) and can be rounded for a fixed point representation. Application of a CC-ALF can be controlled on a variable block size and signaled by a context-coded flag (e.g., a CC-ALF enabling flag) received for each block of samples. The context-coded flag, such as the CC-ALF enabling flag, can be signaled at any suitable level, such as a block level. The block size along with the CC-ALF enabling flag can be received at a slice-level for each chroma component. In some examples, block sizes (in chroma samples) 16×16, 32×32, and 64×64 can be supported.

FIG. 17 shows a syntax example for CC-ALF according to some embodiments of the disclosure. In the FIG. 17 example, alf_ctb_cross_component_cb_idc [xCtb>>CtbLog2SizeY][yCtb>>CtbLog2SizeY] is an index to indicate whether a cross component Cb filter is used and an index of the cross component Cb filter if used. For example, when alf_ctb_cross_component_cb_idc [xCtb>>CtbLog2SizeY][yCtb>>CtbLog2SizeY] is equal to 0, the cross component Cb filter is not applied to block of Cb colour component samples at luma location (xCtb, yCtb); when alf_ctb_cross_component_cb_idc [xCtb>>CtbLog2SizeY][yCtb>>CtbLog2SizeY] is not equal to 0, alf_ctb_cross_component_cb_idc [xCtb>>CtbLog2SizeY][yCtb>>CtbLog2SizeY] is an index for a filter to be applied. For example, alf_ctb_cross_component_cb_idc[xCtb>>CtbLog2SizeY] [yCtb>>CtbLog2SizeY]-th cross component Cb filter is applied to the block of Cb colour component samples at luma location (xCtb, yCtb)

Further, in the FIG. 17 example, alf_ctb_cross_component_cr_idc[xCtb>>CtbLog2SizeY] [yCtb>>CtbLog2SizeY] is used to indicate whether a cross component Cr filter is used and index of the cross component Cr filter is used. For example, when alf_ctb_cross_component_cr_idc[xCtb>>CtbLog2SizeY] [yCtb>>CtbLog2SizeY] is equal to 0, the cross component Cr filter is not applied to block of Cr colour component samples at luma location (xCtb, yCtb); when alf_ctb_cross_component_cr_idc[xCtb>>CtbLog2SizeY] [yCtb>>CtbLog2SizeY] is not equal to 0, alf_ctb_cross_component_cr_idc[xCtb>>CtbLog2SizeY] [yCtb>>CtbLog2SizeY] is the index of the cross component Cr filter. For example, alf_cross_component_cr_idc [xCtb>>CtbLog2SizeY][yCtb>>CtbLog2SizeY]-th cross component Cr filter can be applied to the block of Cr colour component samples at luma location (xCtb, yCtb)

Figure 18A:
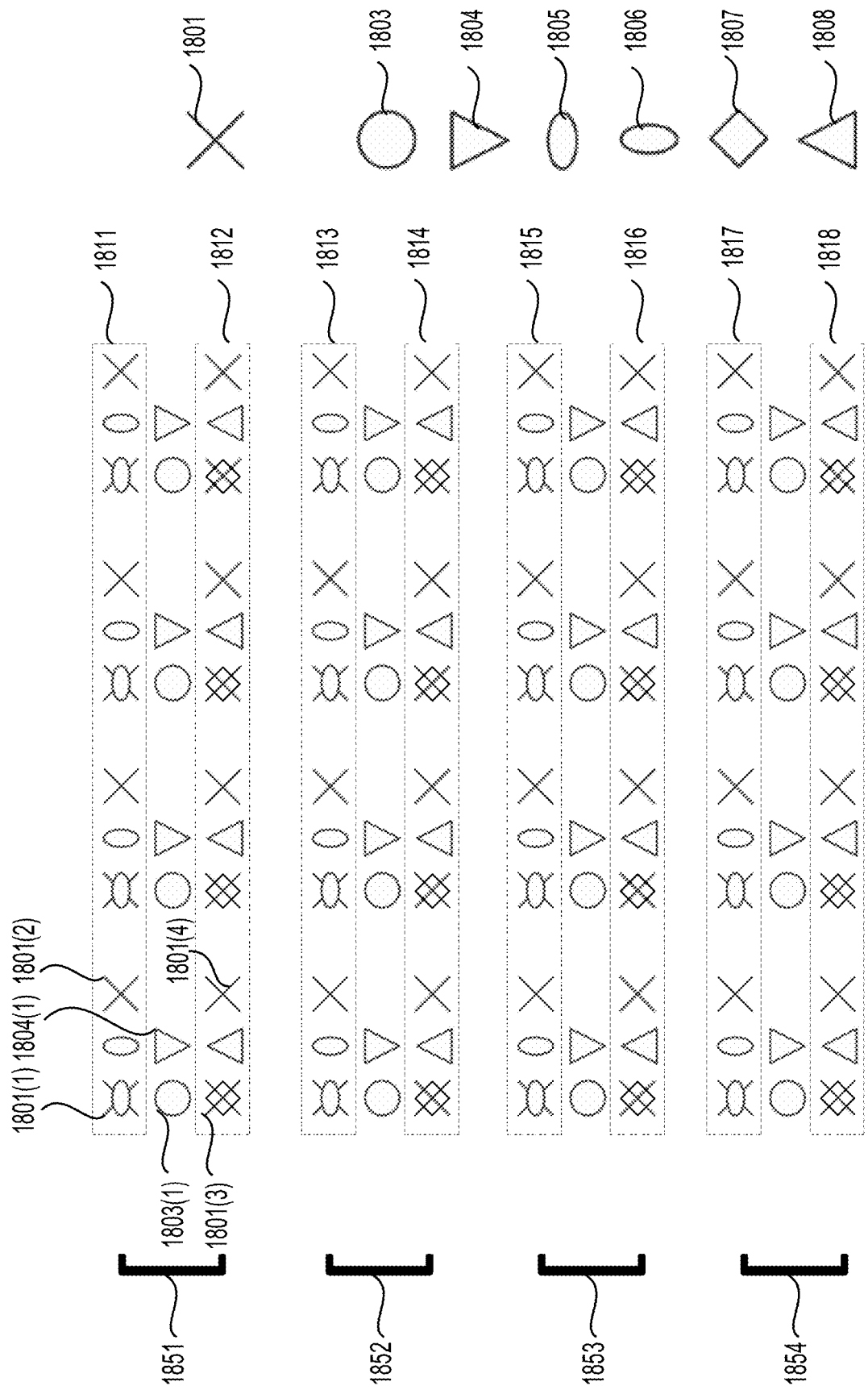
FIGS. 18A-18B show exemplary locations of chroma samples relative to luma samples according to embodiments of the disclosure.
Figure 18B:
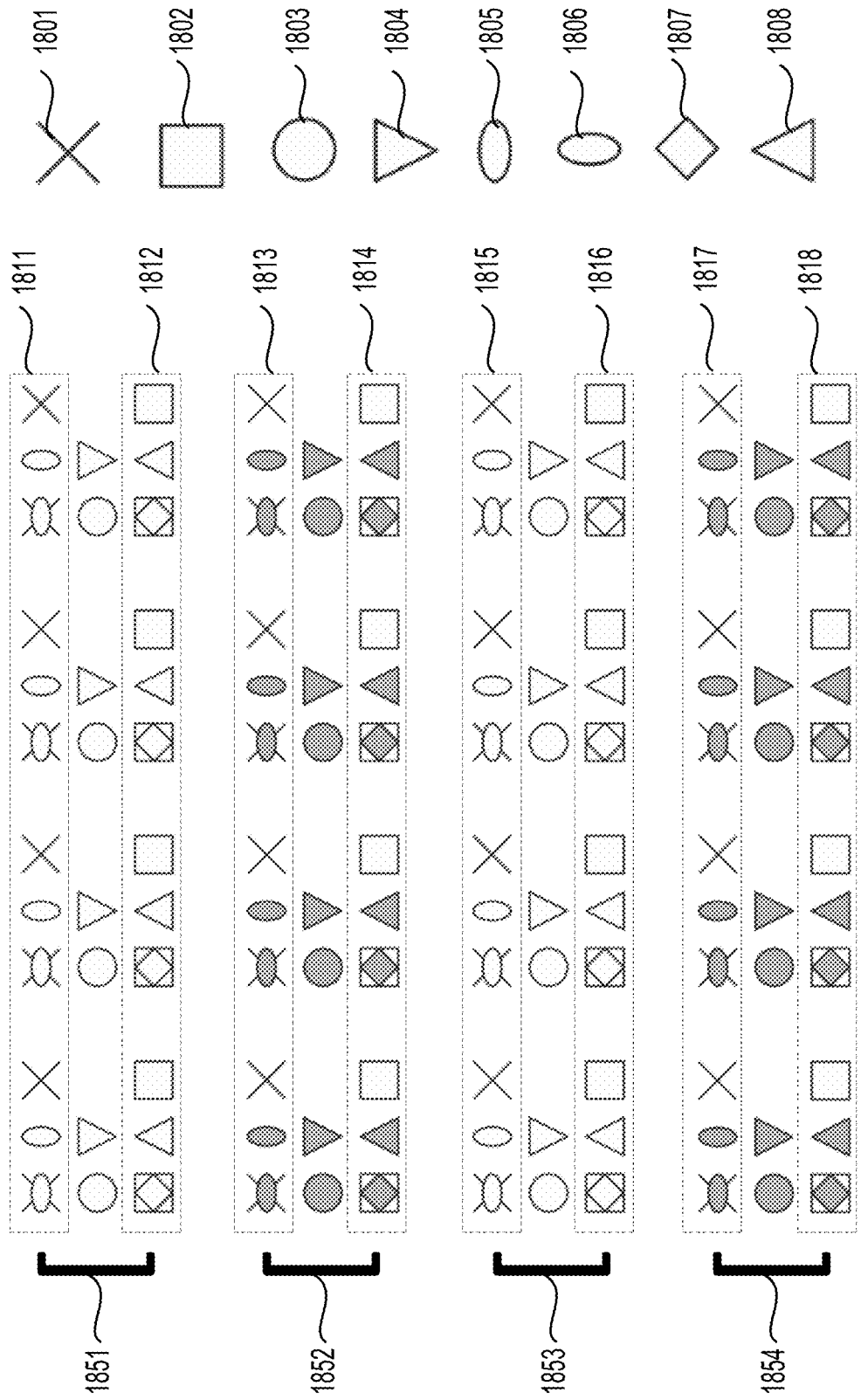

In some examples, chroma subsampling techniques are used, thus a number of samples in each of the chroma block(s) can be less than a number of samples in the luma block. A chroma subsampling format (also referred to as a chroma subsampling format, e.g., specified by chroma_format_idc) can indicate a chroma horizontal subsampling factor (e.g., SubWidthC) and a chroma vertical subsampling factor (e.g., SubHeightC) between each of the chroma block(s) and the corresponding luma block. In an example, the chroma subsampling format is 4:2:0, and thus the chroma horizontal subsampling factor (e.g., SubWidthC) and the chroma vertical subsampling factor (e.g., SubHeightC) are 2, as shown in FIGS. 18A-18B. In an example, the chroma subsampling format is 4:2:2, and thus the chroma horizontal subsampling factor (e.g., SubWidthC) is 2, and the chroma vertical subsampling factor (e.g., SubHeightC) is 1. In an example, the chroma subsampling format is 4:4:4, and thus the chroma horizontal subsampling factor (e.g., SubWidthC) and the chroma vertical subsampling factor (e.g., SubHeightC) are 1. A chroma sample type (also referred to as a chroma sample position) can indicate a relative position of a chroma sample in the chroma block with respect to at least one corresponding luma sample in the luma block.

FIGS. 18A-18B show exemplary locations of chroma samples relative to luma samples according to embodiments of the disclosure. Referring to FIG. 18A, the luma samples (1801) are located in rows (1811)-(1818). The luma samples (1801) shown in FIG. 18A can represent a portion of a picture. In an example, a luma block (e.g., a luma CB) includes the luma samples (1801). The luma block can correspond to two chroma blocks having the chroma subsampling format of 4:2:0. In an example, each chroma block includes chroma samples (1803). Each chroma sample (e.g., the chroma sample (1803(1)) corresponds to four luma samples (e.g., the luma samples (1801(1))-(1801(4)). In an example, the four luma samples are the top-left sample (1801(1)), the top-right sample (1801(2)), the bottom-left sample (1801(3)), and the bottom-right sample (1801(4)). The chroma sample (e.g., (1803(1))) is located at a left center position that is between the top-left sample (1801(1)) and the bottom-left sample (1801(3)), and a chroma sample type of the chroma block having the chroma samples (1803) can be referred to as a chroma sample type 0. The chroma sample type 0 indicates a relative position 0 corresponding to the left center position in the middle of the top-left sample (1801(1)) and the bottom-left sample (1801(3)). The four luma samples (e.g., (1801(1))-(1801(4))) can be referred to as neighboring luma samples of the chroma sample (1803) (1).

In an example, each chroma block includes chroma samples (1804). The above description with reference to the chroma samples (1803) can be adapted to the chroma samples (1804), and thus detailed descriptions can be omitted for purposes of brevity. Each of the chroma samples (1804) can be located at a center position of four corresponding luma samples, and a chroma sample type of the chroma block having the chroma samples (1804) can be referred to as a chroma sample type 1. The chroma sample type 1 indicates a relative position 1 corresponding to the center position of the four luma samples (e.g., (1801(1))-(1801(4))). For example, one of the chroma samples (1804) can be located at a center portion of the luma samples (1801(1))-(1801(4)).

In an example, each chroma block includes chroma samples (1805). Each of the chroma samples (1805) can be located at a top left position that is co-located with the top-left sample of the four corresponding luma samples (1801), and a chroma sample type of the chroma block having the chroma samples (1805) can be referred to as a chroma sample type 2. Accordingly, each of the chroma samples (1805) is co-located with the top left sample of the four luma samples (1801) corresponding to the respective chroma sample. The chroma sample type 2 indicates a relative position 2 corresponding to the top left position of the four luma samples (1801). For example, one of the chroma samples (1805) can be located at a top left position of the luma samples (1801(1))-(1801(4)).

In an example, each chroma block includes chroma samples (1806). Each of the chroma samples (1806) can be located at a top center position between a corresponding top-left sample and a corresponding top-right sample, and a chroma sample type of the chroma block having the chroma samples (1806) can be referred to as a chroma sample type 3. The chroma sample type 3 indicates a relative position 3 corresponding to the top center position between the top-left sample (and the top-right sample. For example, one of the chroma samples (1806) can be located at a top center position of the luma samples (1801(1))-(1801(4)).

In an example, each chroma block includes chroma samples (1807). Each of the chroma samples (1807) can be located at a bottom left position that is co-located with the bottom-left sample of the four corresponding luma samples (1801), and a chroma sample type of the chroma block having the chroma samples (1807) can be referred to as a chroma sample type 4. Accordingly, each of the chroma samples (1807) is co-located with the bottom left sample of the four luma samples (1801) corresponding to the respective chroma sample. The chroma sample type 4 indicates a relative position 4 corresponding to the bottom left position of the four luma samples (1801). For example, one of the chroma samples (1807) can be located at a bottom left position of the luma samples (1801(1))-(1801(4)).

In an example, each chroma block includes chroma samples (1808). Each of the chroma samples (1808) is located at a bottom center position between the bottom-left sample and the bottom-right sample, and a chroma sample type of the chroma block having the chroma samples (1808) can be referred to as a chroma sample type 5. The chroma sample type 5 indicates a relative position 5 corresponding to the bottom center position between the bottom-left sample and the bottom-right sample of the four luma samples (1801). For example, one of the chroma samples (1808) can be located between the bottom-left sample and the bottom-right sample of the luma samples (1801(1))-(1801(4)).

In general, any suitable chroma sample type can be used for a chroma subsampling format. The chroma sample types 0-5 are exemplary chroma sample types described with the chroma subsampling format 4:2:0. Additional chroma sample types may be used for the chroma subsampling format 4:2:0. Further, other chroma sample types and/or variations of the chroma sample types 0-5 can be used for other chroma subsampling formats, such as 4:2:2, 4:4:4, or the like. In an example, a chroma sample type combining the chroma samples (1805) and (1807) is used for the chroma subsampling format 4:2:2.

In an example, the luma block is considered to have alternating rows, such as the rows (1811)-(1812) that include the top two samples (e.g., (1801(1))-(180)(2))) of the four luma samples (e.g., (1801(1))-(1801(4))) and the bottom two samples (e.g., (1801(3))-(1801(4))) of the four luma samples (e.g., (1801(1)-(1801(4))), respectively. Accordingly, the rows (1811), (1813), (1815), and (1817) can be referred to as current rows (also referred to as a top field), and the rows (1812), (1814), (1816), and (1818) can be referred to as next rows (also referred to as a bottom field). The four luma samples (e.g., (1801(1))-(1801(4))) are located at the current row (e.g., (1811)) and the next row (e.g., (1812)). The relative positions 2-3 are located in the current rows, the relative positions 0-1 are located between each current row and the respective next row, and the relative positions 4-5 are located in the next rows.

The chroma samples (1803), (1804), (1805), (1806), (1807), or (1808) are located in rows (1851)-(1854) in each chroma block. Specific locations of the rows (1851)-(1854) can depend on the chroma sample type of the chroma samples. For example, for the chroma samples (1803)-(1804) having the respective chroma sample types 0-1, the row (1851) is located between the rows (1811)-(1812). For the chroma samples (1805)-(1806) having the respective the chroma sample types 2-3, the row (1851) is co-located with the current row (1811). For the chroma samples (1807)-(1808) having the respective the chroma sample types 4-5, the row (1851) is co-located with the next row (1812). The above descriptions can be suitably adapted to the rows (1852)-(1854), and the detailed descriptions are omitted for purposes of brevity.

Any suitable scanning method can be used for displaying, storing, and/or transmitting the luma block and the corresponding chroma block(s) described above in FIG. 18A. In an example, progressive scanning is used.

An interlaced scan can be used, as shown in FIG. 18B. As described above, the chroma subsampling format is 4:2:0 (e.g., chroma_format_idc is equal to 1). In an example, a variable chroma location type (e.g., ChromaLocType) indicates the current rows (e.g., ChromaLocType is chroma_sample_loc_type_top_field) or the next rows (e.g., ChromaLocType is chroma_sample_loc_type_bottom_field). The current rows (1811), (1813), (1815), and (1817) and the next rows (1812), (1814), (1816), and (1818) can be scanned separately, for example, the current rows (1811), (1813), (1815), and (1817) can be scanned first followed by the next rows (1812), (1814), (1816), and (1818) being scanned. The current rows can include the luma samples (1801) while the next rows can include the luma samples (1802).

Similarly, the corresponding chroma block can be interlaced scanned. The rows (1851) and (1853) including the chroma samples (1803), (1804), (1805), (1806), (1807), or (1808) with no fill can be referred to as current rows (or current chroma rows), and the rows (1852) and (1854) including the chroma samples (1803), (1804), (1805), (1806), (1807), or (1808) with gray fill can be referred to as next rows (or next chroma rows). In an example, during the interlaced scan, the rows (1851) and (1853) are scanned first followed by scanning the rows (1852) and (1854).

In some examples, constrained directional enhancement filtering techniques can be used. The use of an in-loop constrained directional enhancement filter (CDEF) can filter out coding artifacts while retaining the details of the image. In an example (e.g., HEVC), sample adaptive offset (SAO) algorithm can achieves a similar goal by defining signal offsets for different classes of pixels. Unlike SAO, CDEF is a non-linear spatial filter. In some examples, CDEF can be constrained to be easily vectorizable (i.e. implementable with single instruction multiple data (SIMD) operations). It is noted that other non-linear filters, such as a median filter, a bilateral filter cannot be handled in the same manner.

In some cases, the amount of ringing artifacts in a coded image tends to be roughly proportional to the quantization step size. The amount of detail is a property of the input image, but the smallest detail retained in the quantized image tends to also be proportional to the quantization step size. For a given quantization step size, the amplitude of the ringing is generally less than the amplitude of the details.

CDEF can be used to identify the direction of each block and then adaptively filter along the identified direction and filter to a lesser degree along directions rotated 45 degrees from the identified direction. In some examples, an encoder can search for the filter strengths and the filter strengths can be signaled explicitly, which allows a high degree of control over the blurring.

Specifically, in some examples, the direction search is performed on the reconstructed pixels, just after the deblocking filter. Since those pixels are available to the decoder, the directions can be searched by the decoder, and thus the directions require no signaling in an example. In some examples, the direction search can operate on certain block size, such 8×8 blocks, which are small enough to adequately handle non-straight edges, while being large enough to reliably estimate directions when applied to a quantized image. Also, having a constant direction over an 8×8 region makes vectorization of the filter easier. In some examples, each block (e.g., 8×8) can be compared to perfectly directional blocks to determine difference. A perfectly directional block is a block where all of the pixels along a line in one direction have the same value. In an example, a difference measure of the block and each of the perfectly directional blocks, such as sum of squared differences (SSD), root mean square (RMS) error can be calculated. Then, a perfectly directional block with minimum difference (e.g., minimum SSD, minimum RMS, and the like) can be determined and the direction of the determined perfectly directional block can be is direction that best matches the pattern in the block.

Figure 19:
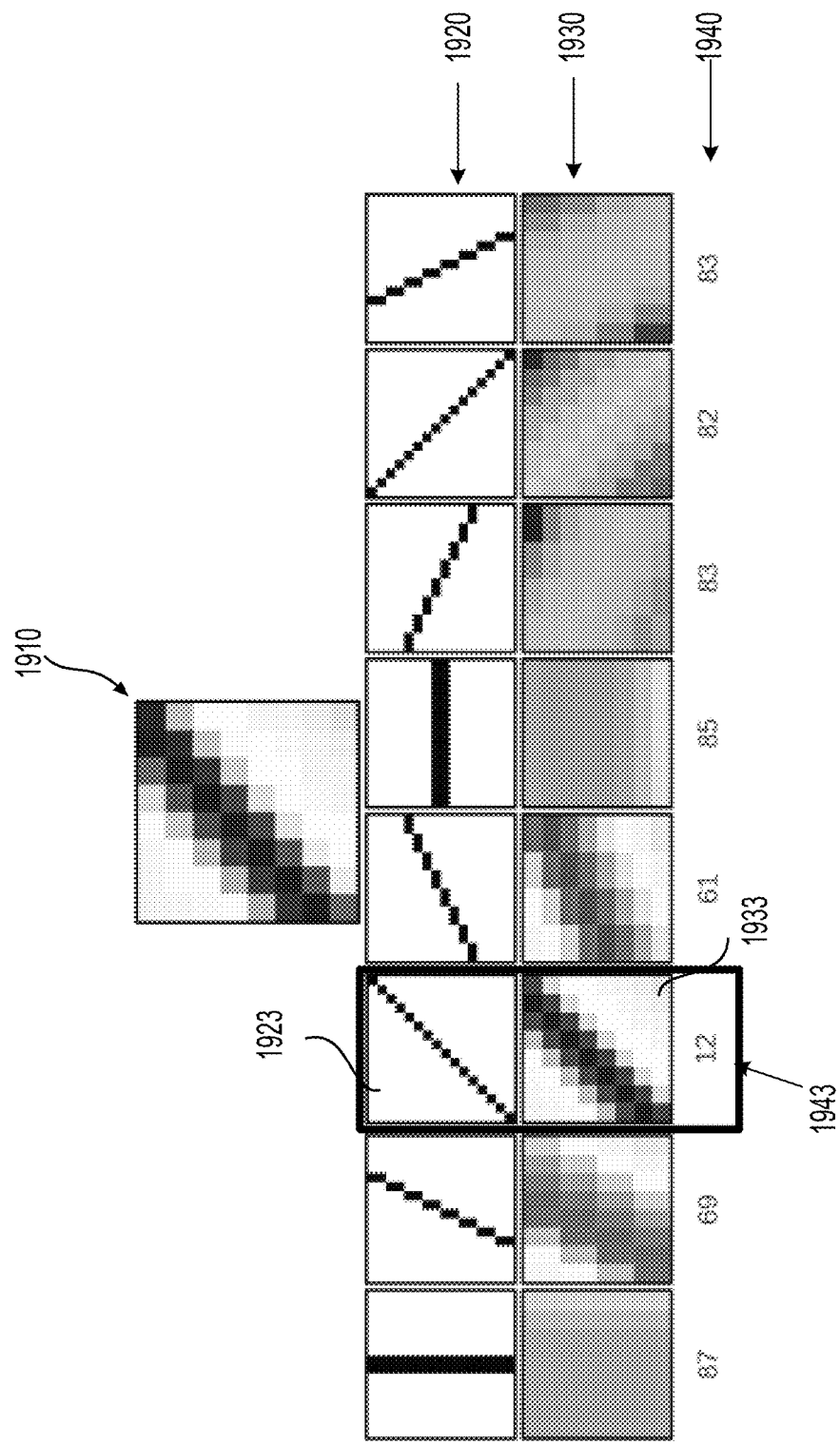
FIG. 19 shows an example of direction search according to an embodiment of the disclosure.

FIG. 19 shows an example of direction search according to an embodiment of the disclosure. In an example, a block (1910) is an 8×8 block that is reconstructed, and output from a deblocking filter. In the FIG. 19 example, the direction search can determine a direction from 8 directions shown by (1920) for the block (1910). 8 perfectly directional blocks (1930) are formed respectively corresponding to the 8 directions (1920). A perfectly directional block corresponding to a direction is a block where pixels along a line of the direction have the same value. Further, a difference measure, such as SSD, RMS error and the like, of the block (1910) and each of the perfectly directional blocks (1930) can be calculated. In the FIG. 19 example, the RMS errors are shown by (1940). As shown by (1943), the RMS error of the block (1910) and the perfectly directional block (1933) is the smallest, thus the direction (1923) is the direction that best matches the pattern in the block (1910).

After the direction of the block is identified, a non-linear low pass directional filter can be determined. For example, the filter taps of the non-linear low pass directional filter can be aligned along the identified direction to reduce ringing while preserving the directional edges or patterns. However, in some examples, directional filtering alone sometimes cannot sufficiently reduce ringing. In an example, extra filter taps are also used on pixels that do not lie along the identified direction. To reduce the risk of blurring, the extra filter taps are treated more conservatively. For this reason, CDEF includes primary filter taps and secondary filter taps. In an example, a complete 2-D CDEF filter can be expressed as Eq. (14):

$$y(i,j) = x(i,j) + \text{round}\left(\sum_{m,n} w^{(p)}_{d,m,n} f(x(m,n) - x(i,j), S^{(p)}, D) + \sum_{m,n} w^{(s)}_{d,m,n} f(x(m,n) - x(i,j), S^{(s)}, D)\right). \quad \text{Eq. (14)}$$

where D denotes a damping parameter, $S^{(p)}$ denotes the strength of the primary filter taps, $S^{(s)}$ denotes the strength of the secondary filter taps, round(•) denotes an operation that rounds ties away from zero, w denote the filter weights and $f(d, S, D)$ is a constraint function operating on the difference between the filtered pixel and each of the neighboring pixels. In an example, for small differences, the function $f(d, S, D)$ is equal to D, that can make the filter to behave like a linear filter; when the difference is large, the function $f(d, S, D)$ is equal to 0, that can effectively ignores the filter taps.

In some examples, in-loop restoration schemes are used in video coding post deblocking to generally denoise and enhance the quality of edges, beyond the deblocking operation. In an example, the in-loop restoration schemes are switchable within a frame per suitably sized tile. The in-loop restoration schemes are based on separable symmetric Wiener filters, dual self-guided filters with subspace projection, and domain transform recursive filters. Because content statistics can vary substantially within a frame, in-loop restoration schemes are integrated within a switchable framework where different schemes can be triggered in different regions of the frame.

Separable symmetric Wiener filter can be one of the in-loop restoration schemes. In some examples, every pixel in a degraded frame can be reconstructed as a non-causal filtered version of the pixels within a w×w window around it where $w=2r+1$ is odd for integer r. If the 2D filter taps are denoted by a $w^2 \times 1$ element vector F in column-vectorized form, a straightforward LMMSE optimization leads to filter parameters being given by $F=H^{-1} M$, where $H=E[XX^T]$ is the autocovariance of x, the column-vectorized version of the $w^2$ samples in the w×w window around a pixel, and $M=E[YX^T]$ is the cross correlation of x with the scalar source sample y, to be estimated. In an example, the encoder can estimate H and M from realizations in the deblocked frame and the source and can send the resultant filter F to the decoder. However, that would not only incur a substantial bit rate cost in transmitting $w^2$ taps, but also non-separable filtering will make decoding prohibitively complex. In some embodiments, several additional constraints are imposed on the nature of F. For the first constraint, F is constrained to be separable so that the filtering can be implemented as separable horizontal and vertical w-tap convolutions. For the second constraint, each of the horizontal and vertical filters are constrained to be symmetric. For the third constraint, the sum of both the horizontal and vertical filter coefficients is assumed to sum to 1.

Dual self-guided filtering with subspace projection can be one of the in-loop restoration schemes. Guided filtering is an image filtering technique where a local linear model shown by Eq. (15):

$$y=Fx+G \qquad \text{Eq. (15)}$$

is used to compute the filtered output y from an unfiltered sample x, where F and G are determined based on the statistics of the degraded image and a guidance image in the neighborhood of the filtered pixel. If the guide image is the same as the degraded image, the resultant so-called self-guided filtering has the effect of edge preserving smoothing. In an example, a specific form of self-guided filtering can be used. The specific form of self-guided filtering depends on two parameters: a radius r and a noise parameter e, and is enumerated as follows steps:

1. Obtain mean $\mu$ and variance $\sigma^2$ of pixels in a $(2r+1) \times (2r+1)$ window around every pixel. This step can be implemented efficiently with box filtering based on integral imaging.
2. Compute for every pixel: $f=\sigma^2/(\sigma^2+e)$; $g=(1-f)\mu$
3. Compute F and G for every pixel as averages off and g values in a 3×3 window around the pixel for use.

The specific form of self-guided filter is controlled by r and e, where a higher r implies a higher spatial variance and a higher e implies a higher range variance.

Figure 20:
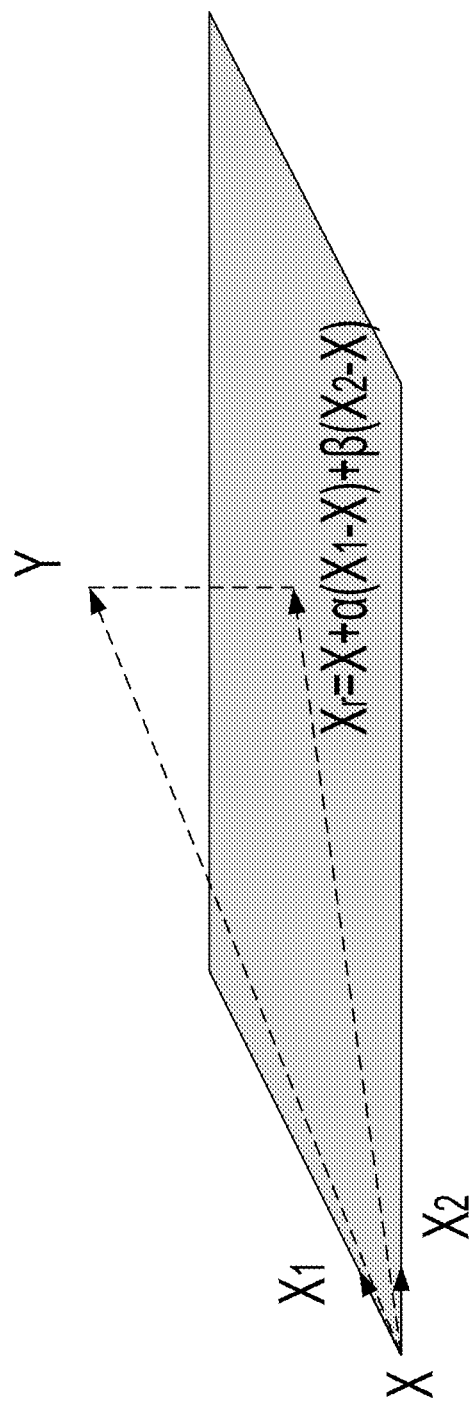
FIG. 20 shows an example illustrating subspace projection in some examples.

FIG. 20 shows an example illustrating subspace projection in some examples. As shown in FIG. 20, even though none of the restorations $X_1$, $X_2$ are close to the source Y, appropriate multipliers $\{\alpha, \beta\}$ can bring them much closer to the source Y as long as they are moving somewhat in the right direction.

In some examples (e.g., HEVC), a filtering technique that is referred to as sample adaptive offset (SAO) can be used. In some examples, SAO is applied to the reconstruction signal after a deblocking filter. SAO can use the offset values given in the slice header. In some examples, for luma samples, the encoder can decide whether to apply (enable) SAO on a slice. When SAO is enabled, the current picture allows recursive splitting of a coding unit into four sub-regions and each sub-region can select an SAO type from multiple SAO types based on features in the sub-region.

FIG. 21 shows a table (2100) of a plurality of SAO types according to an embodiment of the disclosure. In the table (2100), SAO types 0-6 are shown. It is noted that SAO type 0 is used to indicate no SAO application. Further, each SAO type of SAO type 1 to SAO type 6 includes multiple categories. SAO can classify reconstructed pixels of a sub-region into categories and reduce the distortion by adding an offset to pixels of each category in the sub-region. In some examples, edge properties can be used for pixel classification in SAO types 1-4, and pixel intensity can be used for pixel classification in SAO types 5-6.

Specifically, in an embodiment, such as SAO types 5-6, band offset (BO) can be used to classify all pixels of a sub-region into multiple bands. Each band of the multiple bands includes pixels in the same intensity interval. In some examples, the intensity range is equally divided into a plurality of intervals, such as 32 intervals from zero to the maximum intensity value (e.g. 255 for 8-bit pixels), and each interval is associated with an offset. Further, in an example, the 32 bands are divided into two groups, such as a first group and a second group. The first group includes the central 16 bands (e.g., 16 intervals that are in the middle of the intensity range), while the second group includes of the rest 16 bands (e.g., 8 intervals that are at the low side of the intensity range and 8 intervals that are at the high side of the intensity range). In an example, only offsets of one of the two groups are transmitted. In some embodiments, when the pixel classification operation in BO is used, the five most significant bits of each pixel can be directly used as the band index.

Further, in an embodiment, such as SAO types 1-4, edge offset (EO) can be used for pixel classification and determination of offsets. For example, pixel classification can be determined based on 1-dimensional 3-pixel patterns with consideration of edge directional information.

Figure 22:
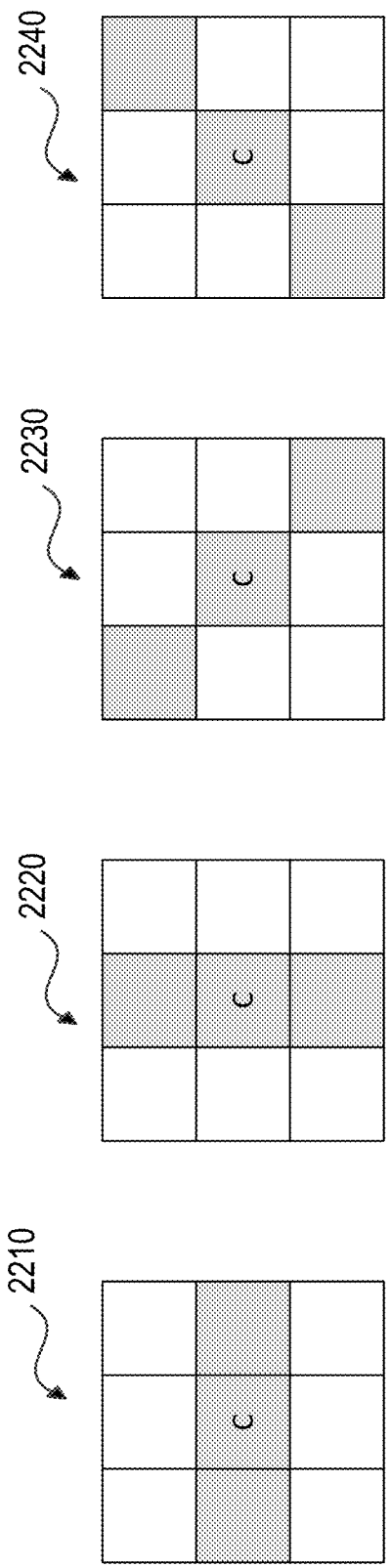
FIG. 22 shows examples of patterns for pixel classification in edge offset in some examples.

FIG. 22 shows examples of 3-pixel patterns for pixel classification in edge offset in some examples. In the FIG. 22 example, a first pattern (2210) (as shown by 3 grey pixels) is referred to as 0-degree pattern (horizontal direction is associated with the 0-degree pattern), a second pattern (2220) (as shown by 3 grey pixels) is referred to as 90-degree pattern (vertical direction is associated with the 90-degree pattern), a third pattern (2230) (as shown by 3 grey pixels) is referred to as 135-degree pattern (135 degree diagonal direction is associated with the 135-degree pattern) and a fourth pattern (2240) (as shown by 3 grey pixels) is referred to as 45-degree pattern (45 degree diagonal direction is associated with the 45-degree pattern). In an example, one of the four directional patterns shown in FIG. 22 can be selected considering edge directional information for a sub-region. The selection can be sent in the coded video bit-stream as side information in an example. Then, pixels in the sub-region can be classified into multiple categories by comparing each pixel with its two neighboring pixels on the direction associated with the directional pattern.

FIG. 23 shows a table (2300) for pixel classification rule for edge offset in some examples. Specifically, a pixel c (also shown in each pattern of FIG. 22) is compared with two neighboring pixels (also shown by grey color in each pattern of FIG. 22), and the pixel c can be classified into one of category 0-4 based on the comparison according to the pixel classification rule shown in FIG. 23.

In some embodiments, the SAO on the decoder side can be operated independently of largest coding unit (LCU) (e.g., CTU), so that the line buffers can be saved. In some examples, pixels of the top and bottom rows in each LCU are not SAO processed when the 90-degree, 135-degree, and 45-degree classification patterns are chosen; pixels of the leftmost and rightmost columns in each LCU are not SAO processed when the 0-degree, 135-degree, and 45-degree patterns are chosen.

FIG. 24 shows an example (2400) of syntaxes that may need to be signaled for a CTU if the parameters are not merged from neighboring CTU. For example, a syntax element sao_type_idx[cIdx][rx][ry] can be signaled to indicate the SAO type of a sub-region. The SAO type may be BO (band offset) or EO (edge offset). When sao_type_idx [cIdx][rx] [ry] has a value of 0, it indicates that SAO is OFF; a value of one to four indicates that one of the four EO categories corresponding to 0°, 90°, 135°, and 45° is used; and a value of five indicates that BO is used. In the FIG. 24 example, each of the BO and EO types has four SAO offset values (sao_offset[cIdx][rx][ry][0] to sao_offset[cIdx][rx] [ry][3]) that are signaled.

As shown in FIG. 24, SAO is a filtering process that requires extra signaling overheads to indicate all related information that is required to perform SAO filtering, as shown in FIG. 24, which may limit the potential of SAO.

Generally, a filtering process can use the reconstructed samples of a first color component as input (e.g., Y or Cb or Cr, or R or G or B) to generate an output, and the output of the filtering process is applied on a second color component that can be the same one as the first color component or that can be another color component that is different from the first color component.

In a related example of cross-component filtering (CCF), filter coefficients are derived based on some mathematical equations. The derived filter coefficients are signaled from encoder side to the decoder side, and the derived filter coefficients are used to generate offsets using linear combinations. The generated offsets are then added to reconstructed samples as a filtering process. For example, the offsets are generated based on linear combinations of the filtering coefficients with luma samples, and the generated offsets are added to the reconstructed chroma samples. The related example of CCF is based on an assumption of a linear mapping relationship between the reconstructed luma sample values and the delta values between the original and reconstructed chroma samples. However, the mapping between the reconstructed luma sample values and the delta values between the original and reconstructed chroma samples does not necessarily follow a linear mapping process, thus the coding performance of CCF may be limited under the linear mapping relationship assumption.

In some examples, non linear mapping techniques can be used in cross-component filtering and/or same color component filtering without significant signaling overheads. In an example, the non linear mapping techniques can be used in the cross-component filtering to generate cross-component sample offset. In another example, the non linear mapping techniques can be used in the same color component filtering to generate local sample offset.

For convenience, a filtering process that uses the non linear mapping techniques can be referred to as sample offset by non linear mapping (SO-NLM). SO-NLM in the cross-component filtering process can be referred to as a cross-component sample offset (CCSO). SO-NLM in the same color component filtering can be referred to as local sample offset (LSO)

In an example, CCSO and LSO can be used as loop filtering to reduce distortion of reconstructed samples. CCSO and LSO do not rely on the linear mapping assumption used in the related example CCF. For example, CCSO does not rely on the assumption of linear mapping relationship between the luma reconstructed sample values and the delta values between the original chroma samples and chroma reconstructed samples. Similarly, LSO does not rely on the assumption of linear mapping relationship between the reconstructed sample values of a color component and the delta values between the original samples of the color component and reconstructed samples of the color component.

In the following description, SO-NLM filtering process is described that use the reconstructed samples of a first color component as input (e.g., Y or Cb or Cr, or R or G or B) to generate an output, and the output of the filtering process is applied on a second color component. When the second color component is the same color component as the first color component, the description is applicable for LSO; and when the second color component is different from the first color component, the description is applicable for CCSO.

In SO-NLM, a non linear mapping is derived at encoder side. A non linear mapping is between reconstructed samples of a first color component in the filter support region and offsets to be added to a second color component in the filter support region. When the second color component is the same as the first color component, the non linear mapping is used in LSO; when the second color component is different from the first color component, the non linear mapping is used in CCSO. The domain of the non linear mapping is determined by different combinations of processed input reconstructed samples (also referred to as combinations of possible reconstructed sample values).

Techniques of SO-NLM can be illustrated using a specific example. In the specific example, reconstructed samples from a first color component located in a filter support area (also referred to as "filter support region") are determined. The filter support area is an area within which the filter can be applied, and the filter support area can have any suitable shape.

Figure 25:
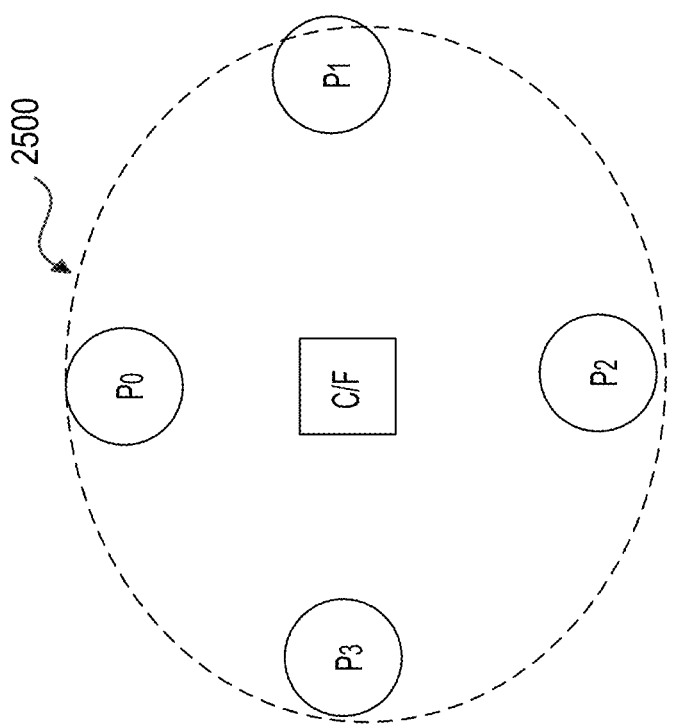
FIG. 25 shows an example of a filter support are according to some embodiments of the disclosure.

FIG. 25 shows an example of a filter support area (2500) according to some embodiments of the disclosure. The filter support area (2500) includes four reconstructed samples: P0, P1, P2 and P3 of a first color component. In the FIG. 25 example, the four reconstructed samples can form a cross-shape in the vertical direction and the horizontal direction, and the center location of the cross-shape is the location for the sample to be filtered. A sample at the center location and of the same color component as P0-P3 is denoted by C. A sample at the center location and of a second color component is denoted by F. The second color component can be the same as the first color component of P0-P3 or can be different from the first color component of P0-P3.

Figure 26:
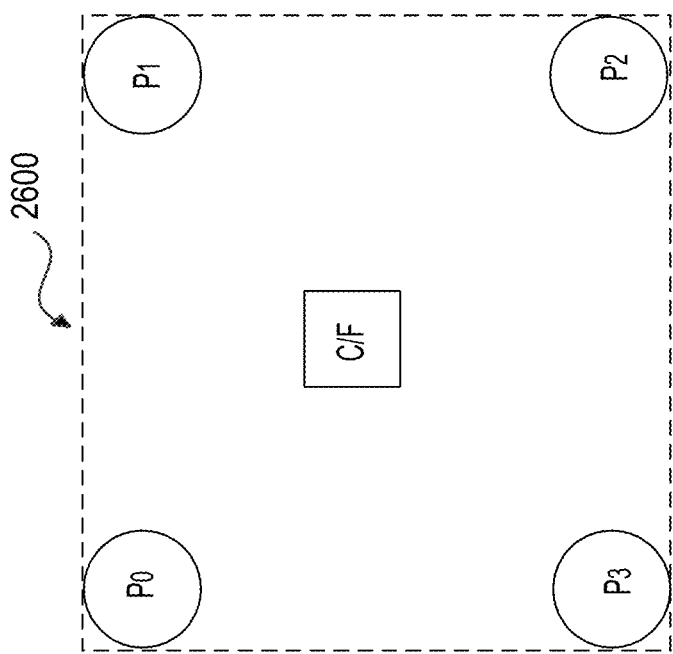
FIG. 26 shows an example of another filter support area according to some embodiments of the disclosure.

FIG. 26 shows an example of another filter support area (2600) according to some embodiments of the disclosure. The filter support area (2600) includes four reconstructed samples P0, P1, P2 and P3 of a first color component that form a square shape. In the FIG. 26 example, the center location of the square shape is the location of the sample to be filtered. A sample at the center location and of the same color component as P0-P3 is denoted by C. A sample at the center location and of a second color component is denoted by F. The second color component can be the same as the first color component of P0-P3 or can be different from the first color component of P0-P3.

Then, the reconstructed samples are suitably processed to form filter taps. In the specific example, the reconstructed samples are processed in following two steps.

In a first step, the delta values respectively between P0-P3 and C are computed. For example, m0 denotes the delta value between P0 to C; m1 denotes the delta value between P1 to C; m2 denotes the delta value between P2 to C; m3 denotes the delta value between P3 to C.

In a second step, the delta values m0-m3 are further quantized, the quantized values are denoted as d0, d1, d2, d3. In an example, the quantized value can be one of −1, 0, 1 based on a quantization process. For example, a value m can be quantized to −1 when m is smaller than −N (N is a positive value and is referred to as quantization step size; the value m can be quantized to 0 when m is in a range of [−N, N]; and the value m can be quantized to 1 when m is greater than N. In some examples, the quantization step size N can be one of 4, 8, 12, 16 and the like.

In some embodiments, the quantized values d0-d3 are filter taps and can be used to identify one combination in the filter domain. For example, the filter taps d0-d3 can form a combination in the filter domain. Each filter tap can have three quantized values, thus when four filter taps are used, the filter domain includes 81 (3×3×3×3) combinations.

FIGS. 27A-27C show a table (2700) having 81 combinations according to an embodiment of the disclosure. The table (2700) includes 81 rows corresponding to 81 combinations. In each row corresponding to a combination, the first column includes an index of the combinations; the second column includes the value of filter tap d0 for the combination; the third column includes the value of filter tap d1 for the combination; the fourth column includes the value of filter tap d2 for the combination; the fifth column includes the value of filter tap d3 for the combination; the six column includes the offset value associated with the combination for the non linear mapping. In an example, when the filter taps d0-d3 are determined, the offset value (denoted by s) associated with the combination of d0-d3 can be determined according to the table (2700). In an example, offset values s0-s80 are integers, such as 0, 1, −1, 3, −3, 5, −5, −7, and the like.

In some embodiments, the final filtering process of SO-NLM can be applied as shown in Eq. (16):

$$f'=\text{clip}(F+s) \quad \text{Eq. (16)}$$

where F is the reconstructed sample of the second color component to be filtered, and s is the offset value determined according to filter taps that are processing results of reconstructed samples of first color component, such as using table (2700). The sum of the reconstructed sample F and the offset value s is further clipped into the range associated with bit-depth to determine the final filtered sample f' of the second color component.

It is noted that, in the case of LSO, the second color component in the above description is the same as the first color component; and, in the case of CCSO, the second color component in the above description can be different from the first color component.

It is noted that, the above description can be adjusted for other embodiments of the present disclosure.

In some examples, at the encoder side, the encoding device can derive a mapping between reconstructed samples of a first color component in a filter support region and the offsets to be added to reconstructed samples of a second color component. The mapping can be any suitable linear or non-linear mapping. Then, the filtering process can be applied at the encoder side and/or the decoder side based on the mapping. For example, the mapping is suitably informed to the decoder (e.g., the mapping is included in a coded video bitstream that is transmitted from the encoder side to the decoder side), and then the decoder can perform the filtering process based on the mapping.

In some examples, techniques that are referred to as semi decoupled partition (SDP) can be used. In an example, one of the SDP techniques uses semi decoupled tree (SDT). The SDT technique is also referred to as semi separate tree (SST) or flexible block partitioning for chroma component. In the SDT technique, luma and chroma blocks in a super block (SB) (such as defined in AOMedia Video 1 (AV1)) or a CTU (such as defined in HEVC) may have same or different block partitioning, and the block partition can dependent on the luma coded block sizes or the luma tree depth. In an example, when the luma block area size is greater than a first threshold T1 or coding tree splitting depth of luma block is smaller than or equal to a second threshold T2, chroma block uses the same coding tree structure as luma. Otherwise, when the luma block area size is smaller than or equal to T1 or luma splitting depth is larger than T2, the corresponding chroma block can have different coding block partitioning from luma component, which is called flexible block partitioning for chroma component. In the above example, T1 is a positive integer, such as 128 or 256; T2 is a positive integer, such as 1 or 2.

Figure 28:
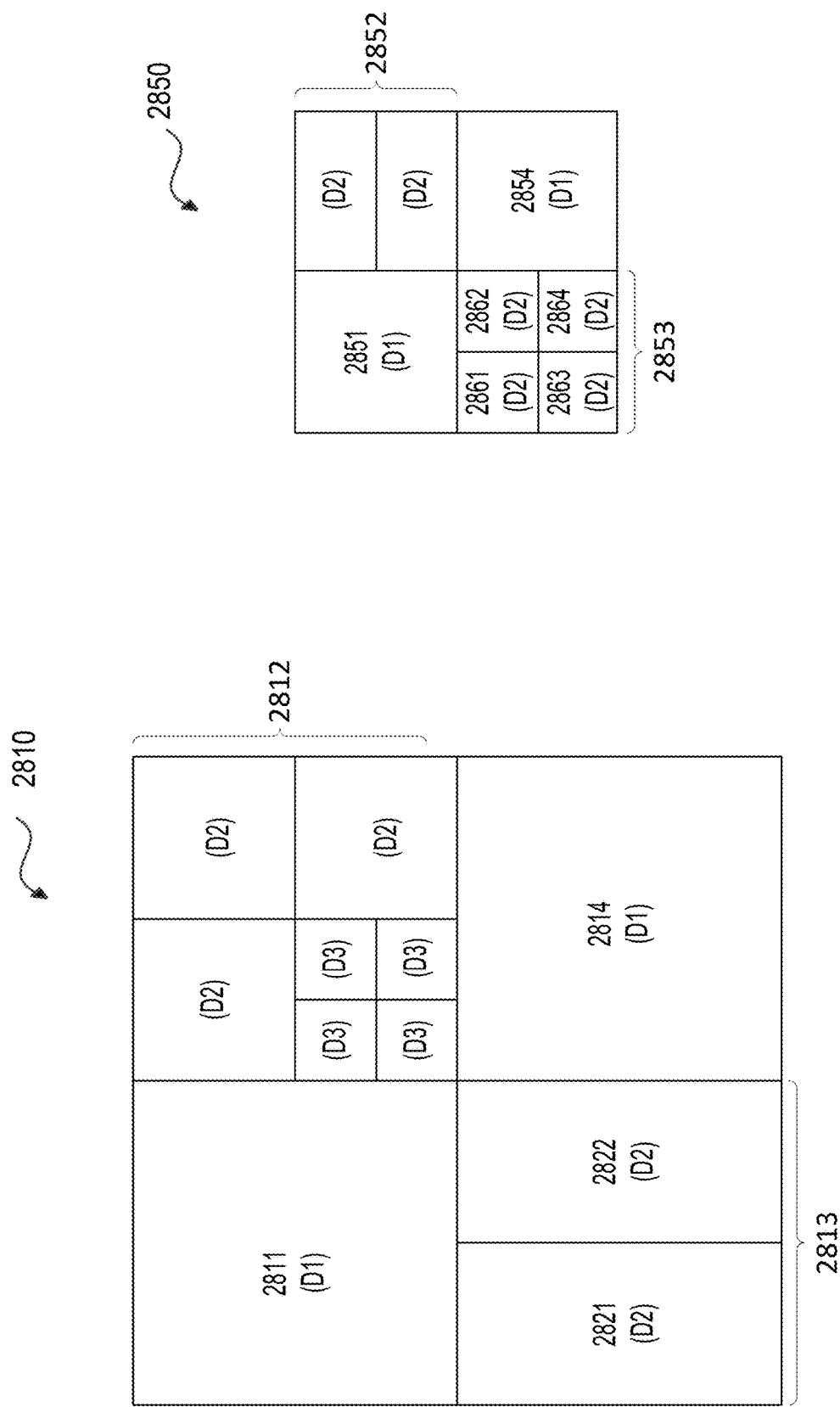
FIG. 28 shows an example of coding tree structures for luma and chroma components.

FIG. 28 shows an example of coding tree structures for luma and chroma components. FIG. 28 shows a first partition structure (2810) for a luma component in a super block, and a second partition structure (2850) for a chroma component in a super block. It is noted that while 4:2:0 chroma subsampling scheme is used in the FIG. 28, the FIG. 28 can be suitably changed when other chroma subsampling scheme is used. In FIG. 28, D1 in a block indicates that the coding tree splitting depth of the block is 1; D2 in a block indicates that the coding tree splitting depth of the block is 2; and D3 in a block indicates that the coding tree splitting depth of the block is 3.

In the FIG. 28 example, T2 is set to 1. Thus, the first partition structure (2810) and the second partition structure (2850) have the same block partition structure when the coding tree splitting depth is equal to 1. For example, the luma block area of the super block is partitioned into (2811)-(2814) according to quad-tree (QT) partition (e.g., a larger square block is divided into four smaller square blocks of equal size) and the corresponding chroma block area is partitioned into (2851)-(2854) according to QT partition.

When the coding tree splitting depth is larger than T2, luma block area and corresponding chroma block area can have different coding block partition structure. For example, the luma block area (2813) is partitioned into (2821) and (2822) using vertical binary tree (BT) partition (e.g., a larger block is divided by a vertical line into two smaller blocks of equal size), and the corresponding chroma block area (2853) is partitioned into (2861)-(2864) using QT partition.

Further, in another SDP technique, luma and chroma components may share the partial tree structure from the root node of the super block, and the condition on when luma and chroma start separate tree partitioning depends on partitioning information of luma component or high level syntax from the bitstream.

Block based compensation can be used for inter prediction and intra prediction. For the inter prediction, block based compensation from a different picture is known as motion compensation. Block based compensation can also be done from a previously reconstructed area within the same picture. The block based compensation from reconstructed area within the same picture is referred to as intra picture block compensation, current picture referencing (CPR), or intra block copy (IntraBC). A displacement vector that indicates an offset between a current block and a reference block in the same picture is referred to as a block vector (BV) where the current block can be encoded/decoded based on the reference block. Different from a motion vector in motion compensation, which can be at any value (positive or negative, at either x or y direction), a BV has a few constraints to ensure that the reference block is available and already reconstructed. Also, in some examples, for parallel processing consideration, some reference area that is tile boundary, slice boundary, or wavefront ladder shape boundary is excluded.

The block vector (BV) can be coded to specify the location of the predictor block. The coding of a block vector could be either explicit or implicit. In the explicit mode, a BV difference between a block vector and a predictor for the block vector (also referred to as block vector predictor) is signaled. In the implicit mode, the block vector is recovered from a predictor for the block vector (referred to as block vector predictor) without using the BV difference, in a similar way as a motion vector in the merge mode. The explicit mode can be referred to as a non-merge BV prediction mode. The implicit mode can be referred to as a merge BV prediction mode.

The resolution of a block vector, in some implementations, is restricted to integer positions. In other implementations, the block vector is allowed to point to fractional positions.

In some examples, for current block, a flag (e.g., IntraBC flag) indicating whether current block is in the IntraBC mode is first transmitted in the coded video bitstream. Then, if the current block is in the IntraBC mode, the BV difference (e.g., diff) is obtained by subtracting the reference BV (e.g., the block vector predictor) from the current BV, and then diff is classified into four types according to the horizontal and vertical components of the diff. Type information needs to be transmitted into the bitstream, after that, diff values of two components may be signalled based on the type information.

According to an aspect of the disclosure, in the IntraBC mode, a predictor block is formed from the reconstructed samples in the current picture before application of in loop filtering; and in the inter prediction mode, a predictor block is formed from the reconstructed samples in other picture after application of in loop filtering. When loop filters are disabled in the IntraBC mode, picture buffer of reconstructed samples can be shared between the IntraBC mode and the inter prediction, and hardware design can be simplified.

In some examples (e.g., AOMedia Video 1 (AV1)), when the IntraBC mode is enabled, the IntraBC mode is enabled for both luma and chroma components, and all the loop filters are disabled for both luma and chroma components. The loop filters can include de-blocking filter, the constrained directional enhancement filter (CDEF), the loop restoration (LR) filter, and the like. However, when SDP is turned on in some examples, the IntraBC mode may be enabled for one color component, such as luma component but disabled for another color component, such as a chroma component. According to some aspects of the disclosure, loop filers can be enabled or disenable for different color components, and better picture quality can be achieved due to the use of loop filters in some color components. For example, when the IntraBC mode is only enabled for luma component, loop filters may be enabled/disabled differently for the luma component and chroma component. For example, the loop filters are disabled for the luma component in response to the enabling of the IntraBC mode for the luma component, and loop filters may be enabled for the chroma component in response to the disabling of the IntraBC mode for the chroma component. Thus, picture buffer can be shared between the IntraBC mode and the inter prediction mode due to the disabling of the loop filters for the luma component, and better picture quality can be achieved due to the use of loop filters in the chroma component.

In the following description, filters used in the in loop filtering are referred to as (in) loop filters and can include any of the filters that respectively operate on the reconstructed samples within one frame/slice/tile that are accessible. The (in) loop filters include, but not limited to de-blocking (DB) filter, CDEF filter, loop Restoration filter, CCSO filter, LSO filter, and the like.

According to some aspects of the disclosure, when the IntraBC mode is enabled for luma component but disabled for chroma component, at least one of the (in) loop filters is allowed for chroma component.

In some embodiments, all the (in) loop filters may be allowed for chroma component when the IntraBC mode is enabled for luma component but disabled for chroma component. In an example, the DB filter, the CDEF filter, the LR filter, the CCSO filter, and the LSO filter are all allowed for chroma component when the IntraBC mode is enabled for luma component but disabled for chroma component.

In some embodiments, the CCSO filter or the LSO filter is allowed for chroma component when the IntraBC mode is enabled for luma component but disabled for chroma component.

In an embodiment, both the CCSO filter and the CDEF filter are allowed for chroma component when the IntraBC mode is enabled for luma component but disabled for chroma component.

In an embodiment, the enabling/disabling of the IntraBC mode for different color components is signaled separately at picture-level. Then, if the IntraBC mode is disabled for a color component at picture level, at least one of the loop filters is allowed for the color component in a picture.

In an example, two separate picture-level flags are used to respectively indicate the enabling/disabling of the IntraBC mode for luma and chroma components at the picture level. For example, a first flag "cm→features.allow_intrabc_luma" is used to indicate the enabling/disabling of the IntraBC mode for luma component (also referred to as luma channel), and a second flag "cm→features.allow_intrabc_chroma" is used to indicate the enabling/disabling of the IntraBC mode for chroma components (also referred to as chroma channel). When the first flag "cm→features.allow_intrabc_luma" is on (e.g., has a value of "1") and the second flag "cm→features.allow_intrabc_chroma" is off (e.g., has a value of "0"), at least one of the loop filters is allowed for chroma component.

In another example, three separate picture-level flags are used to indicate the enabling/disabling of the IntraBC mode for Y/Cb/Cr components, respectively. For example, a first flag "cm→features.allow_intrabc_y" is used to indicate the enabling/disabling of the IntraBC mode for Y component (also referred to as luma component), a second flag "cm→features.allow_intrabc_cb" is used to indicate the enabling/disabling of the IntraBC mode for Cb component (also referred to as a first chroma component), and a third flag "cm→features.allow_intrabc_cr" is used to indicate the enabling/disabling of the IntraBC mode for Cr component (also referred to as a second chroma component). When, for example, the first flag "cm→features.allow_intrabc_y" is on (e.g., has a value of "1"), the second flag "cm→features.allow_intrabc_cb" and the third flag "cm→features.allow_intrabc_cr" are off (respectively have value "0"), then at least one of the loop filters is allowed for Cb component and Cr component.

In an embodiment, if the IntraBC mode is turned on for both luma and chroma component, luma blocks and the associated chroma blocks share the same block vector (BV), and loop filters are disabled for the luma blocks and the chroma blocks in some examples.

In some examples, the condition of whether applying (in) loop filter for one color component (e.g., Y, Cb, Cr) depends on the flag indicating the enabling/disabling of the IntraBC mode for the said color component. In an example, when a flag indicates disabling of the IntraBC mode for a color component (e.g., Y, Cb, Cr), (in) loop filters can be applied to the color component; and when a flag indicates enabling of the IntraBC mode for a color component (e.g., Y, Cb, Cr), (in) loop filters are disabled for the color component.

In some examples, the condition of whether applying (in) loop filter for one color channel (luma/chroma) depends on the flag indicating the enabling/disabling of the IntraBC mode for the said color channel. In an example, when a flag indicates disabling of the IntraBC mode for a color channel (e.g., luma or chroma), (in) loop filters can be applied to the color channel; and when a flag indicates enabling of the IntraBC mode for a color channel (e.g., luma or chroma), (in) loop filters are disabled for the color channel.

In some embodiments, the enabling/disabling of the IntraBC mode for different color components is signaled separately at block level. Then, if the IntraBC mode is disabled for a color component at the block level, at least one of the loop filters is allowed for the current block in the color component. A block may be interpreted as a prediction block, a coding block, or a coding unit, i.e. CU, a CTU block, or super block, or a filtering unit (FU).

In an example, two separate block level flags are used to respectively indicate the enabling/disabling of the IntraBC mode for luma and chroma components at the block level. For example, a first flag "mi_params→mi_grid_base[x]→allow_intrabc_luma" is used to indicate the enabling/disabling of the IntraBC mode for luma component at the block level and a second flag "mi_params→mi_grid_base[x]→allow_intrabc_chroma" is used to indicate the enabling/disabling of the IntraBC mode for chroma components at the block level. When, for example, the first flag "mi_params→mi_grid_base[x]→allow_intrabc_luma" is on (e.g., has a value of "1") and the second flag "mi_params→mi_grid_base[x]→allow_intrabc_chroma" is off (has a value of "0"), at least one of the loop filters is allowed for current chroma block.

In another example, three separate block level flags are used to indicate the enabling/disabling of the IntraBC mode for Y/Cb/Cr blocks, respectively. For example, a first flag "mi_params→mi_grid_base[x]→allow_intrabc_y" is used to indicate the enabling/disabling of the IntraBC mode for Y block; a second flag "mi_params→mi_grid_base[x]→allow_intrabc_cb" is used to indicate the enabling/disabling of the IntraBC mode for Cb block; and a third flag "mi_params→mi_grid_base[x]→allow_intrabc_cr" is used to indicate the enabling/disabling of the IntraBC mode for Cr block. When, for example, the first flag "mi_params→mi_grid_base[x]→allow_intrabc_y" is on (e.g., has a value of "1"), the second flag "mi_params→mi_grid_base[x]→allow_intrabc_cb" and the third flag "mi_params→mi_grid_base[x]→allow_intrabc_cr" are off (e.g., respectively have value of "0"), at least one of the loop filters is allowed for current Cb block and current Cr block.

In another embodiment, the enabling/disabling of the IntraBC mode can be signaled in high level syntax (HLS), such as adaptation parameter set (APS), slice header, frame header, picture parameter set (PPS), sequence parameter setting (SPS), video parameter set (VPS), and the like.

In some embodiments, whether a specific loop filter, e.g., DB filter, CDEF filter, LR filter, CCSO filter, LSO filter, can be applied when the IntraBC mode is applied depends on another flag that is signalled at HLS (APS, Slice header, frame header, PPS, SPS, VPS). In an embodiment, a flag "slice_force_cdef_flag_luma" is signalled at slice header for the CDEF filter. In an example, when the flag "slice_force_cdef_flag_luma" is signalled in a slice header of a slice as true (e.g., has a value "1"), the CDEF filter will be applied for luma component in the slice regardless whether the IntraBC mode is enabled. In another example, when the flag "slice_force_cdef_flag_luma" is signalled in a slice header of a slice as false (e.g., has a value of "0"), then whether CDEF filter will be applied for the luma component in the slice still depends on whether the IntraBC mode is enabled.

In some embodiments, at least one of the (in) loop filters is allowed for chroma component no matter whether the IntraBC mode is allowed for current frame/slice/tile or not.

In some embodiments, all the (in) loop filters may be allowed for chroma component no matter whether the IntraBC mode is enabled for current frame/slice/tile or not.

In another embodiment, CCSO filter or LSO filter or CDEF filter is allowed for chroma component no matter whether the IntraBC mode is enabled for current frame/slice/tile or not.

According to some aspects of the disclosure, SDP can be used to determine enabling/disabling of loop filters. When SDP is applied, at least one of the (in) loop filters is allowed for chroma component.

In some embodiments, all the (in) loop filters may be allowed for chroma component when SDP is applied. In an example, the DB filter, the CDEF filter, the LR filter, the CCSO filter, and the LSO filter are all allowed for chroma component when SDP is applied.

In some embodiments, the CCSO filter or the LSO filter is allowed for chroma component when SDP is applied.

In an embodiment, both the CCSO filter and the CDEF filter are allowed for chroma component when SDP is applied.

Figure 29:
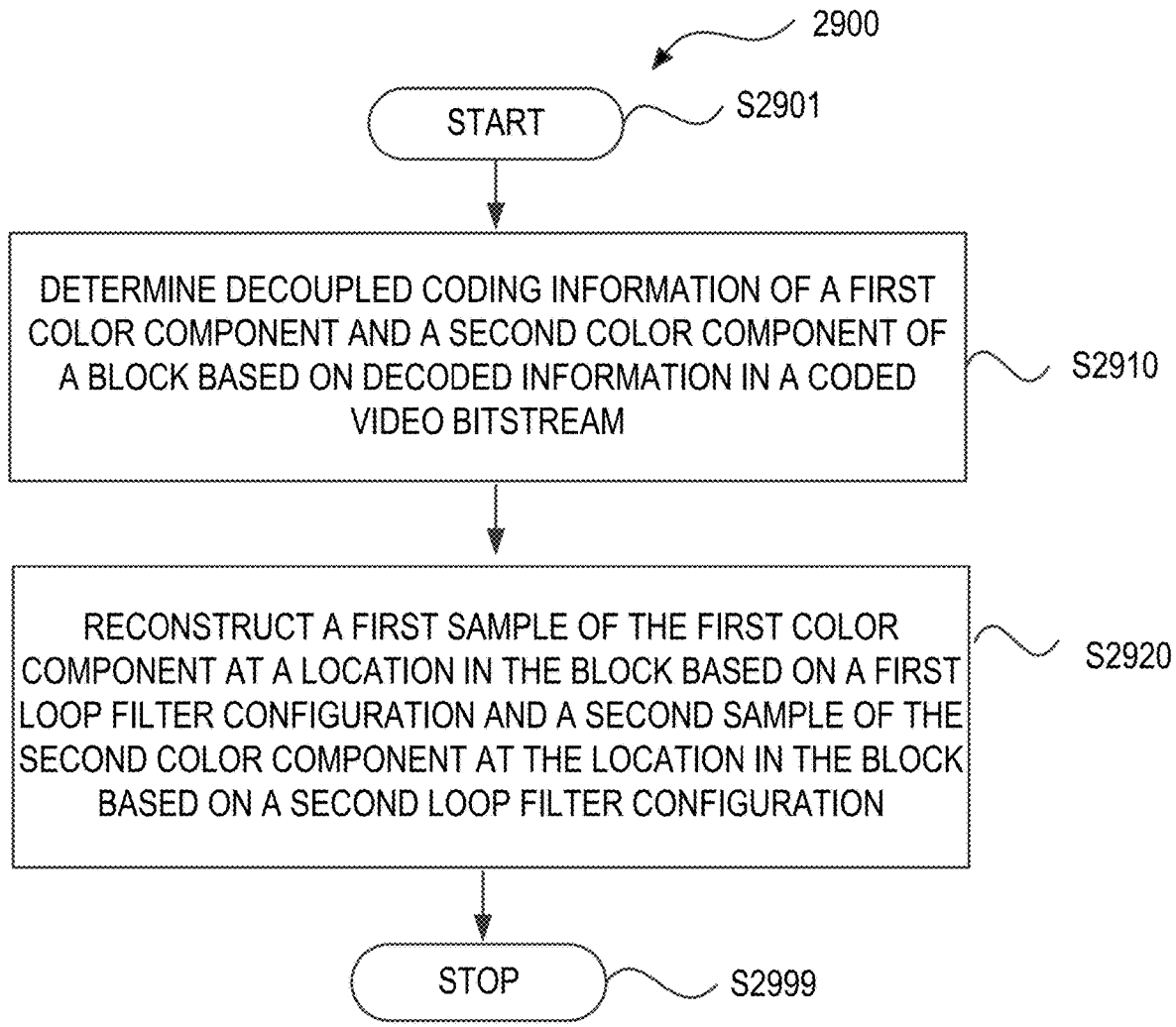
FIG. 29 shows a flow chart outlining a process according to an embodiment of the disclosure.

FIG. 29 shows a flow chart outlining a process (2900) according to an embodiment of the disclosure. The process (2900) can be used to reconstruct a block in a picture of a coded video sequence. The term block may be interpreted as a prediction block, a coding unit, a luma block, a chroma block, or the like. In various embodiments, the process (2900) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2900) is implemented in software instructions, thus when the processing circuitry executes the software instructions, the processing circuitry performs the process (2900). The process starts at (S2901) and proceeds to (S2910).

At (S2910), decoupled coding information of a first color component and a second color component of a block is determined based on decoded information in a coded video bitstream. In some examples, the decoupled coding information includes an enabling/disabling difference of an intra block copy mode for a luma component and a chroma component. For example, the intra block copy mode is enabled for the luma component and is disabled for the chroma components. In some examples, the decoupled coding information includes decoupled partitioning structures for the luma component and the chroma component. In an example, SDP is applied, and the thus luma component and the chroma component have different partition structures in the block.

In some embodiments, the decoupled coding information for the first color component and the second color component in the block is determined based on respective enabling/disabling signals for the first color component and the second color component of at least one of a block level, a video parameter set (VPS), a sequence parameter set (SPS), a picture parameter set (PPS), an adaptation parameter set (APS), a slice header, and a tile header.

In some examples, a first enabling/disabling flag associated with a luma component is decoded from the coded video bitstream, and a second enabling/disabling flag associated with chroma components is decoded from the coded video bitstream. The decoupled coding information for the luma component and the chroma components is determined based on the first enabling/disabling flag and the second enabling/disabling flag.

In some examples, a first enabling/disabling flag associated with a luma component is decoded from the coded video bitstream; a second enabling/disabling flag associated with a first chroma component is decoded from the coded video bitstream; and a third enabling/disabling flag associated with a second chroma component is decoded from the coded video bitstream. Then, the decoupled coding information for the luma component, the first chroma component and the second chroma component is determined based on the first enabling/disabling flag, the second enabling/disabling flag, and the third enabling/disabling flag.

At (S2920), a first sample of the first color component at a location in the block is reconstructed based on a first loop filter configuration, and a second sample of the second color component at the location in the block is reconstructed based on a second loop filter configuration. The first loop filter configuration is different from the second loop filter configuration.

In some embodiments, at least one of a de-blocking filter, a constrained directional enhancement filter (CDEF), a loop restoration filter, a local sample offset (LSO) filter and a cross-component sample offset (CCSO) filter are enabled in one of the first loop filter configuration and the second loop filter configuration; and the de-blocking filter, the constrained directional enhancement filter (CDEF), the loop restoration filter, a local sample offset (LSO) filter and the cross-component sample offset (CCSO) filter are disabled in another of the first loop filter configuration and the second loop filter configuration.

In an embodiment, the de-blocking filter, the constrained directional enhancement filter (CDEF), the loop restoration filter, the local sample offset (LSO) filter and the cross-component sample offset (CCSO) filter are all enabled in the second loop filter configuration associated with a chroma component in response to a disabling of an intra block copy mode for the chroma component and an enabling of the intra block copy mode for the luma component.

In another embodiment, one of the local sample offset (LSO) filter and the cross-component sample offset (CCSO) filter is enabled in the second loop filter configuration associated with a chroma component in response to a disabling of an intra block copy mode for the chroma component and an enabling of the intra block copy mode for the luma component.

In another embodiment, both of the constrained directional enhancement filter (CDEF), and the cross-component sample offset (CCSO) filter are enabled in the second loop filter configuration associated with a chroma component in response to a disabling of an intra block copy mode for the chroma component and an enabling of the intra block copy mode for the luma component.

In some embodiments, a flag associated with a specific loop filter is decoded from a higher level syntax than the block, and the specific loop filter is applied to a luma component in response to the flag being true regardless of the decoupled coding information.

The process (2900) proceeds to (S2999), and terminates.

The process (2900) can be suitably adapted. Step(s) in the process (2900) can be modified and/or omitted. Additional step(s) can be added. Any suitable order of implementation can be used.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 30 shows a computer system (3000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 30:
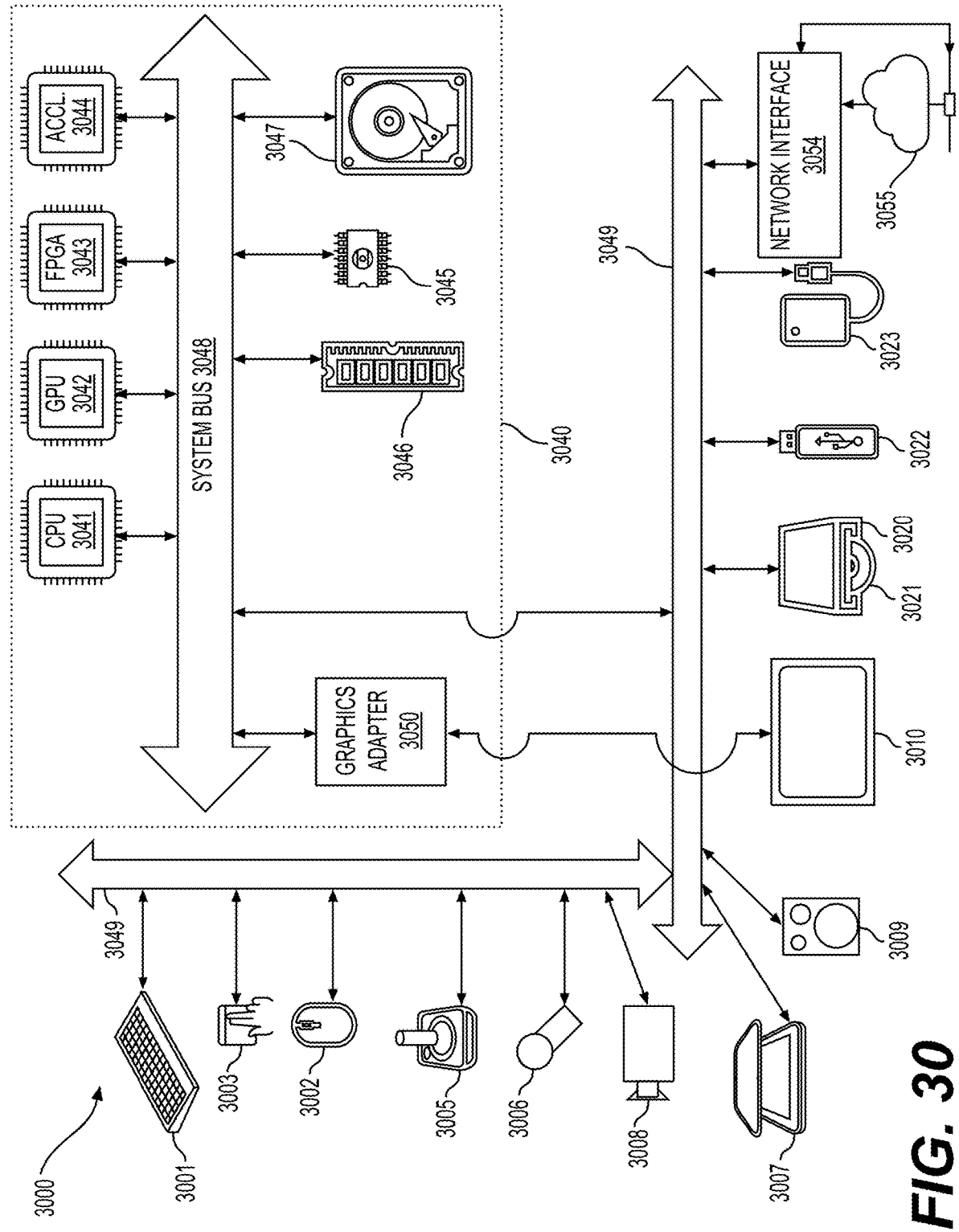
FIG. 30 is a schematic illustration of a computer system in accordance with an embodiment.

The components shown in FIG. 30 for computer system (3000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3000).

Computer system (3000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3001), mouse (3002), trackpad (3003), touch screen (3010), data-glove (not shown), joystick (3005), microphone (3006), scanner (3007), camera (3008).

Computer system (3000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3010), data-glove (not shown), or joystick (3005), but there can also be tactile feedback devices that do not serve as input devices), audio output devices (such as: speakers (3009), headphones (not depicted)), visual output devices (such as screens (3010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (3000) can also include human accessible storage devices and their associated media such as optical media including CD/DVD ROM/RW (3020) with CD/DVD or the like media (3021), thumb-drive (3022), removable hard drive or solid state drive (3023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3000) can also include an interface (3054) to one or more communication networks (3055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (3049) (such as, for example USB ports of the computer system (3000)); others are commonly integrated into the core of the computer system (3000) by attachment to a system bus as described below (for example Ethernet interface into a PC computer system or cellular network interface into a smart-phone computer system). Using any of these networks, computer system (3000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3040) of the computer system (3000).

The core (3040) can include one or more Central Processing Units (CPU) (3041), Graphics Processing Units (GPU) (3042), specialized programmable processing units in the form of Field Programmable Gate Areas (FPGA) (3043), hardware accelerators for certain tasks (3044), graphics adapter (3050), and so forth. These devices, along with Read-only memory (ROM) (3045), Random-access memory (3046), internal mass storage such as internal non-user accessible hard drives, SSDs, and the like (3047), may be connected through a system bus (3048). In some computer systems, the system bus (3048) can be accessible in the form of one or more physical plugs to enable extensions by additional CPUs, GPU, and the like. The peripheral devices can be attached either directly to the core's system bus (3048), or through a peripheral bus (3049). In an example, a display (3010) can be connected to the graphics adapter (3050). Architectures for a peripheral bus include PCI, USB, and the like.

CPUs (3041), GPUs (3042), FPGAs (3043), and accelerators (3044) can execute certain instructions that, in combination, can make up the aforementioned computer code. That computer code can be stored in ROM (3045) or RAM (3046). Transitional data can be also be stored in RAM (3046), whereas permanent data can be stored for example, in the internal mass storage (3047). Fast storage and retrieve to any of the memory devices can be enabled through the use of cache memory, that can be closely associated with one or more CPU (3041), GPU (3042), mass storage (3047), ROM (3045), RAM (3046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (3000), and specifically the core (3040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3040) that are of non-transitory nature, such as core-internal mass storage (3047) or ROM (3045). The software implementing various embodiments of the present disclosure can be stored in such devices and executed by core (3040). A computer-readable medium can include one or more memory devices or chips, according to particular needs. The software can cause the core (3040) and specifically the processors therein (including CPU, GPU, FPGA, and the like) to execute particular processes or particular parts of particular processes described herein, including defining data structures stored in RAM (3046) and modifying such data structures according to the processes defined by the software. In addition or as an alternative, the computer system can provide functionality as a result of logic hard-wired or otherwise embodied in a circuit (for example: accelerator (3044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
MPM: most probable mode
WAIP: Wide-Angle Intra Prediction
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SDR: standard dynamic range
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
PDPC: Position Dependent Prediction Combination
ISP: Intra Sub-Partitions
SPS: Sequence Parameter Setting While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for filtering in video encoding, comprising:
   when (i) an intra block copy (IBC) mode is disabled for a chroma component of a block and the IBC mode is enabled for a luma component of the block or (ii) decoupled partitioning structures are applied to the luma component of the block and the chroma component of the block,
   enabling at least one loop filter for the chroma component of the block;
   determining a first sample of the luma component at a location in the block based on a first loop filter configuration that does not include the at least one loop filter; and
   determining a second sample of the chroma component at the location in the block based on a second loop filter configuration that includes the at least one loop filter.

2. The method of claim 1, wherein
   the IBC mode is disabled for the chroma component of the block and the IBC mode is enabled for the luma component of the block, and
   the method includes encoding decoupled coding information indicating that the IBC mode is disabled for the chroma component of the block and the IBC mode is enabled for the luma component of the block.

3. The method of claim 1, wherein
   the enabling includes enabling the at least one loop filter including at least one of a de-blocking filter, a constrained directional enhancement filter (CDEF), a loop restoration filter, a local sample offset (LSO) filter, or a cross-component sample offset (CCSO) filter in the second loop filter configuration; and
   the method includes disabling the de-blocking filter, the CDEF, the loop restoration filter, the LSO filter, and the CCSO filter in the first loop filter configuration.

4. The method of claim 3, wherein the enabling comprises:
   enabling the de-blocking filter, the CDEF, the loop restoration filter, the LSO filter, and the CCSO filter in the second loop filter configuration associated with the chroma component when the IBC mode is disabled for the chroma component and the IBC mode is enabled for the luma component.

5. The method of claim 3, wherein the enabling comprises:
   enabling one of the LSO filter or the CCSO filter in the second loop filter configuration associated with the chroma component when the IBC mode is disabled for the chroma component and the IBC mode is enabled for the luma component.

6. The method of claim 3, wherein the enabling comprises:
   enabling the CDEF and the CCSO filter in the second loop filter configuration associated with the chroma component when the IBC mode is disabled for the chroma component and the IBC mode is enabled for the luma component.

7. The method of claim 1, further comprising:
   determining decoupled coding information of the luma component and the chroma component in the block, the decoupled coding information indicating at least one of: (i) an enabling/disabling difference of the IBC mode for the luma component and the chroma component; and (ii) the decoupled partitioning structures for the luma component and the chroma component; and encoding the decoupled coding information in at least one of a block level, a video parameter set (VPS), a sequence parameter set (SPS), a picture parameter set (PPS), an adaptation parameter set (APS), a slice header, and a tile header.

8. The method of claim 1, further comprising:
determining a first enabling/disabling flag associated with the luma component and a second enabling/disabling flag associated with the chroma component based on the decoupling of the chroma component and the luma component; and
encoding the first enabling/disabling flag and the second enabling/disabling flag in at least one of a block level, a video parameter set (VPS), a sequence parameter set (SPS), a picture parameter set (PPS), an adaptation parameter set (APS), a slice header, and a tile header.

9. The method of claim 1, wherein the decoupled partitioning structures are applied to the luma component of the block and the chroma component of the block, and
the method includes encoding decoupled coding information indicating that the decoupled partitioning structures are applied to the luma component of the block and the chroma component of the block.

10. An apparatus for filtering in video decoding, comprising:
processing circuitry configured to:
receive decoupled coding information in a bitstream indicating that (i) an intra block copy (IBC) mode is disabled for a chroma component of a block and the IBC mode is enabled for a luma component of the block or (ii) decoupled partitioning structures are applied to the luma component of the block and the chroma component of the block,
enable at least one loop filter for the chroma component of the block;
determine a first sample of the luma component at a location in the block based on a first loop filter configuration that does not include the at least one loop filter; and
determine a second sample of the chroma component at the location in the block based on a second loop filter configuration that includes the at least one loop filter.

11. The apparatus of claim 10, wherein
the decoupled coding information indicates that the IBC mode is disabled for the chroma component of the block and the IBC mode is enabled for the luma component of the block; and
the IBC mode is disabled for the chroma component of the block and the IBC mode is enabled for the luma component of the block.

12. The apparatus of claim 10, wherein the processing circuitry is configured to:
enable the at least one loop filter including at least one of a de-blocking filter, a constrained directional enhancement filter (CDEF), a loop restoration filter, a local sample offset (LSO) filter, or a cross-component sample offset (CCSO) filter in the second loop filter configuration; and
disable the de-blocking filter, the CDEF, the loop restoration filter, the LSO filter, and the CCSO filter in the first loop filter configuration.

13. The apparatus of claim 12, wherein the processing circuitry is configured to:
enable the de-blocking filter, the CDEF, the loop restoration filter, the LSO filter, and the CCSO filter in the second loop filter configuration associated with the chroma component when the IBC mode is disabled for the chroma component and the IBC mode is enabled for the luma component.

14. The apparatus of claim 12, wherein the processing circuitry is configured to:
enable one of the LSO filter or the CCSO filter in the second loop filter configuration associated with the chroma component when the IBC mode is disabled for the chroma component and the IBC mode is enabled for the luma component.

15. The apparatus of claim 12, wherein the processing circuitry is configured to:
enable the CDEF and the CCSO filter in the second loop filter configuration associated with the chroma component when the IBC mode is disabled for the chroma component and the IBC mode is enabled for the luma component.

16. The apparatus of claim 10, wherein the processing circuitry is configured to:
receive the decoupled coding information in at least one of a block level, a video parameter set (VPS), a sequence parameter set (SPS), a picture parameter set (PPS), an adaptation parameter set (APS), a slice header, and a tile header in the bitstream.

17. The apparatus of claim 10, wherein
the decoupled coding information includes a first enabling/disabling flag associated with the luma component and a second enabling/disabling flag associated with the chroma component in at least one of a block level, a video parameter set (VPS), a sequence parameter set (SPS), a picture parameter set (PPS), an adaptation parameter set (APS), a slice header, and a tile header in the bitstream, and
the first enabling/disabling flag associated with the luma component and the second enabling/disabling flag associated with the chroma component indicate the decoupling of the chroma component and the luma component.

18. The apparatus of claim 10, wherein
the decoupled coding information indicates that the decoupled partitioning structures are applied to the luma component of the block and the chroma component of the block, and
the decoupled partitioning structures are applied to the luma component of the block and the chroma component of the block.

19. A method of processing visual media data, the method comprising:
processing a bitstream of the visual media data according to a format rule, wherein
the bitstream includes decoupled coding information indicating that (i) an intra block copy (IBC) mode is disabled for a chroma component of a block and the IBC mode is enabled for a luma component of the block or (ii) decoupled partitioning structures are applied to the luma component of the block and the chroma component of the block, and
the format rule specifies that:
at least one loop filter for the chroma component of the block is enabled;
a first sample of the luma component at a location in the block is determined based on a first loop filter configuration that does not include the at least one loop filter; and a second sample of the chroma component at the location in the block is determined based on a second loop filter configuration that includes the at least one loop filter.

20. The method of claim 19, wherein the IBC mode is disabled for the chroma component of the block and the IBC mode is enabled for the luma component of the block.

* * * * *